United States Patent
Uekusa et al.

(10) Patent No.: US 10,790,509 B2
(45) Date of Patent: *Sep. 29, 2020

(54) POSITIVE-ELECTRODE ACTIVE MATERIAL PRECURSOR FOR NONAQUEOUS ELECTROLYTE SECONDARY BATTERY, POSITIVE-ELECTRODE ACTIVE MATERIAL FOR NONAQUEOUS ELECTROLYTE SECONDARY BATTERY, METHOD FOR MANUFACTURING POSITIVE-ELECTRODE ACTIVE MATERIAL PRECURSOR FOR NONAQUEOUS ELECTROLYTE SECONDARY BATTERY, AND METHOD FOR MANUFACTURING POSITIVE-ELECTRODE ACTIVE MATERIAL FOR NONAQUEOUS ELECTROLYTE SECONDARY BATTERY

(71) Applicant: SUMITOMO METAL MINING CO., LTD., Tokyo (JP)

(72) Inventors: Kikoo Uekusa, Niihama (JP); Satoshi Matsumoto, Ichikawa (JP); Masao Wakabayashi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 16/066,445

(22) PCT Filed: Jan. 5, 2017

(86) PCT No.: PCT/JP2017/000148
§ 371 (c)(1),
(2) Date: Jun. 27, 2018

(87) PCT Pub. No.: WO2017/119451
PCT Pub. Date: Jul. 13, 2017

(65) Prior Publication Data
US 2019/0006671 A1    Jan. 3, 2019

(30) Foreign Application Priority Data

Jan. 6, 2016   (JP) ................................ 2016-001366
Sep. 23, 2016  (JP) ................................ 2016-186242

(51) Int. Cl.
*H01M 4/525*   (2010.01)
*C01G 53/00*   (2006.01)
(Continued)

(52) U.S. Cl.
CPC .......... *H01M 4/525* (2013.01); *C01G 53/006* (2013.01); *C01G 53/06* (2013.01); *C01G 53/50* (2013.01);
(Continued)

(58) Field of Classification Search
CPC ................ H01M 4/525; H01M 4/505; H01M 2004/028; H01M 2004/021; C01G 53/006;
(Continued)

(56) References Cited

U.S. PATENT DOCUMENTS

2008/0057396 A1 * 3/2008 Fujihara ................ H01M 4/13
                                                          429/212
2008/0193841 A1   8/2008 Sun et al.
(Continued)

FOREIGN PATENT DOCUMENTS

JP    2008-535173    8/2008
JP    2011-028999    2/2011
(Continued)

OTHER PUBLICATIONS

Yuichi Sato, R&D of Solid Solution Cathode Materials for Lithium Ion Batteries, FB Technical News, No. 66, Jan. 2011, pp. 3-10, with English Abs.
(Continued)

*Primary Examiner* — Andrew J. Oyer
(74) *Attorney, Agent, or Firm* — IPUSA, PLLC

(57) ABSTRACT

A positive-electrode active material precursor for a nonaqueous electrolyte secondary battery is provided that includes a
(Continued)

nickel-cobalt-manganese carbonate composite represented by general formula $Ni_xCo_yMn_zM_tCO_3$ (where $x+y+z+t=1$, $0.05 \leq x \leq 0.3$, $0.1 \leq y \leq 0.4$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W) and a hydrogen-containing functional group, wherein H/Me representing the ratio of the amount of hydrogen to the amount of metal components Me included in the positive-electrode active material precursor is greater than or equal to 1.60.

6 Claims, 5 Drawing Sheets

(51) Int. Cl.
*C01G 53/06* (2006.01)
*H01M 4/505* (2010.01)
*H01M 4/02* (2006.01)

(52) U.S. Cl.
CPC ......... *H01M 4/505* (2013.01); *C01P 2004/03* (2013.01); *C01P 2004/32* (2013.01); *C01P 2004/50* (2013.01); *C01P 2004/61* (2013.01); *C01P 2006/11* (2013.01); *C01P 2006/12* (2013.01); *C01P 2006/40* (2013.01); *H01M 2004/021* (2013.01); *H01M 2004/028* (2013.01)

(58) Field of Classification Search
CPC ..... C01G 53/50; C01G 53/06; C01P 2004/61; C01P 2004/50; C01P 2004/32; C01P 2006/40; C01P 2006/12; C01P 2006/11; C01P 2004/03
See application file for complete search history.

(56) References Cited

U.S. PATENT DOCUMENTS

| | | |
|---|---|---|
| 2013/0032753 A1 | 2/2013 | Yamamoto et al. |
| 2013/0078520 A1 | 3/2013 | Toya et al. |
| 2013/0230775 A1 | 9/2013 | Endo |
| 2013/0313471 A1 | 11/2013 | Endo et al. |
| 2014/0242463 A1 | 8/2014 | Song et al. |
| 2014/0306151 A1 | 10/2014 | Endo |
| 2016/0093881 A1 | 3/2016 | Schroedle et al. |
| 2016/0308197 A1* | 10/2016 | Hong .................... H01M 4/366 |

FOREIGN PATENT DOCUMENTS

| | | |
|---|---|---|
| JP | 2011-146392 | 7/2011 |
| JP | 2011-181193 | 9/2011 |
| JP | 2011-198759 | 10/2011 |
| JP | 2012-151083 | 8/2012 |
| JP | 2012-252964 | 12/2012 |
| JP | 2013-182782 | 9/2013 |
| JP | 2014-510004 | 4/2014 |
| JP | 2015-191847 | 11/2015 |
| JP | 2016-069209 | 5/2016 |
| WO | 2013/084923 | 6/2013 |
| WO | 2014/069469 | 5/2014 |
| WO | 2014/180686 | 11/2014 |

OTHER PUBLICATIONS

International Search Report dated Apr. 4, 2017 with respect to PCT/JP2017/000148.
International Search Report dated Apr. 4, 2017 with respect to PCT/JP2017/000170.
Office Action dated Jun. 30, 2020 issued with respect to the related U.S. Appl. No. 16/067,218.

* cited by examiner

POSITIVE-ELECTRODE ACTIVE MATERIAL PRECURSOR FOR NONAQUEOUS ELECTROLYTE SECONDARY BATTERY, POSITIVE-ELECTRODE ACTIVE MATERIAL FOR NONAQUEOUS ELECTROLYTE SECONDARY BATTERY, METHOD FOR MANUFACTURING POSITIVE-ELECTRODE ACTIVE MATERIAL PRECURSOR FOR NONAQUEOUS ELECTROLYTE SECONDARY BATTERY, AND METHOD FOR MANUFACTURING POSITIVE-ELECTRODE ACTIVE MATERIAL FOR NONAQUEOUS ELECTROLYTE SECONDARY BATTERY

TECHNICAL FIELD

The present invention relates to a positive-electrode active material precursor for a nonaqueous electrolyte secondary battery, a positive-electrode active material for a nonaqueous electrolyte secondary battery, a method for manufacturing a positive-electrode active material precursor for a nonaqueous electrolyte secondary battery, and a method for manufacturing a positive-electrode active material for a nonaqueous electrolyte secondary battery.

BACKGROUND ART

In recent years, with the widespread use of portable electronic devices, such as mobile phones and notebook computers, there is a high demand for the development of small and light nonaqueous electrolyte secondary batteries having high energy density. There is also a high demand for the development of high-output secondary batteries as large batteries for motor drive power sources.

Lithium ion batteries are secondary batteries that can meet these requirements. A lithium ion secondary battery includes a negative electrode, a positive electrode, an electrolytic solution, and the like. Materials capable of sustaining lithium insertion and deinsertion are used as a negative-electrode active material and a positive-electrode active material.

Lithium ion batteries are currently the subject of substantial research and development. In particular, a lithium ion secondary battery using a layered or spinel type lithium metal composite oxide as a positive-electrode material can achieve a high voltage of around 4V and is therefore being developed for practical applications as a battery having high energy density.

Various lithium composite oxides have been proposed for use as the positive-electrode material of such a lithium ion secondary battery. For example, lithium-cobalt composite oxide ($LiCoO_2$), which is relatively easy to synthesize; lithium-nickel composite oxide ($LiNiO_2$) using nickel as a cheaper alternative to cobalt; lithium-nickel-cobalt-manganese composite oxide ($LiNi_{1/3}Co_{1/3}Mn_{1/3}O_2$), lithium-manganese composite oxide ($LiMn_2O_4$) using manganese, lithium-nickel-manganese composite oxide ($LiNi_{0.5}Mn_{0.5}O_2$); lithium-rich nickel-cobalt-manganese composite oxide ($Li_2MnO_3$—$LiNi_xMn_yCo_zO_2$) and the like have been proposed.

Among these positive electrode active materials, lithium-rich nickel-cobalt-manganese composite oxide is attracting attention as a material having high capacity and excellent thermal stability. The lithium-rich nickel-cobalt-manganese composite oxide is a layered compound like lithium-cobalt composite oxide and lithium-nickel composite oxide (e.g., see Non-Patent Literature Document 1).

Methods for manufacturing a precursor for obtaining such lithium-rich nickel-cobalt-manganese composite oxide are disclosed in Patent Document 1 and Patent Document 2, for example.

PRIOR ART DOCUMENTS

Patent Documents

Patent Document 1: Japanese Unexamined Patent Application Publication No. 2011-028999
Patent Document 2: Japanese Unexamined Patent Application Publication No. 2011-146392 NON-PATENT LITERATURE DOCUMENTS
Non-Patent Literature Document 1: "R&D of Solid Solution Cathode Materials for Lithium Ion Batteries", FB TECHNICAL NEWS, No. 66, January 2011, pp. 3-10

SUMMARY OF THE INVENTION

Problem to be Solved by the Invention

An effective measure for increasing the output of a lithium ion secondary battery includes reducing the moving distance between the positive electrode and the negative electrode of the lithium ion cell. As such, it is advantageous to use a positive-electrode material including porous particles having uniform pores within the particles.

Although Patent Documents 1 and 2 describe methods for manufacturing a precursor and the composition of the positive electrode active material that is manufactured using the precursor, the above documents make no reference to the particle structure of the positive electrode active material and the internal structure of secondary particles.

In view of the above problems of the prior art, one aspect of the present invention is directed to providing a positive electrode active material precursor for a nonaqueous electrolyte secondary battery that is capable of forming a positive electrode active material for the nonaqueous electrolyte secondary battery containing porous particles.

Means for Solving the Problem

According to one embodiment of the present invention, a positive-electrode active material precursor for a nonaqueous electrolyte secondary battery is provided that includes a nickel-cobalt-manganese carbonate composite represented by general formula $Ni_xCo_yMn_zM_tCO_3$ (where $x+y+z+t=1$, $0.05 \le x \le 0.3$, $0.1 \le y \le 0.4$, $0.55 \le z \le 0.8$, $0 \le t \le 0.1$, and M denotes at least one additional element selected from a group consisting of Mg, Ca, Al, Ti, V, Cr, Zr, Nb, Mo, and W), and a hydrogen-containing functional group, wherein H/Me representing the ratio of the amount of hydrogen H to the amount of metal components Me included in the positive-electrode active material precursor is greater than or equal to 1.60.

Advantageous Effect of the Invention

According to an aspect of the present invention, a positive-electrode active material precursor for a nonaqueous electrolyte secondary battery may be provided that is capable of forming a positive-electrode active material for a nonaqueous electrolyte secondary battery containing porous particles.

EMBODIMENTS FOR IMPLEMENTING THE INVENTION

Figure 1:
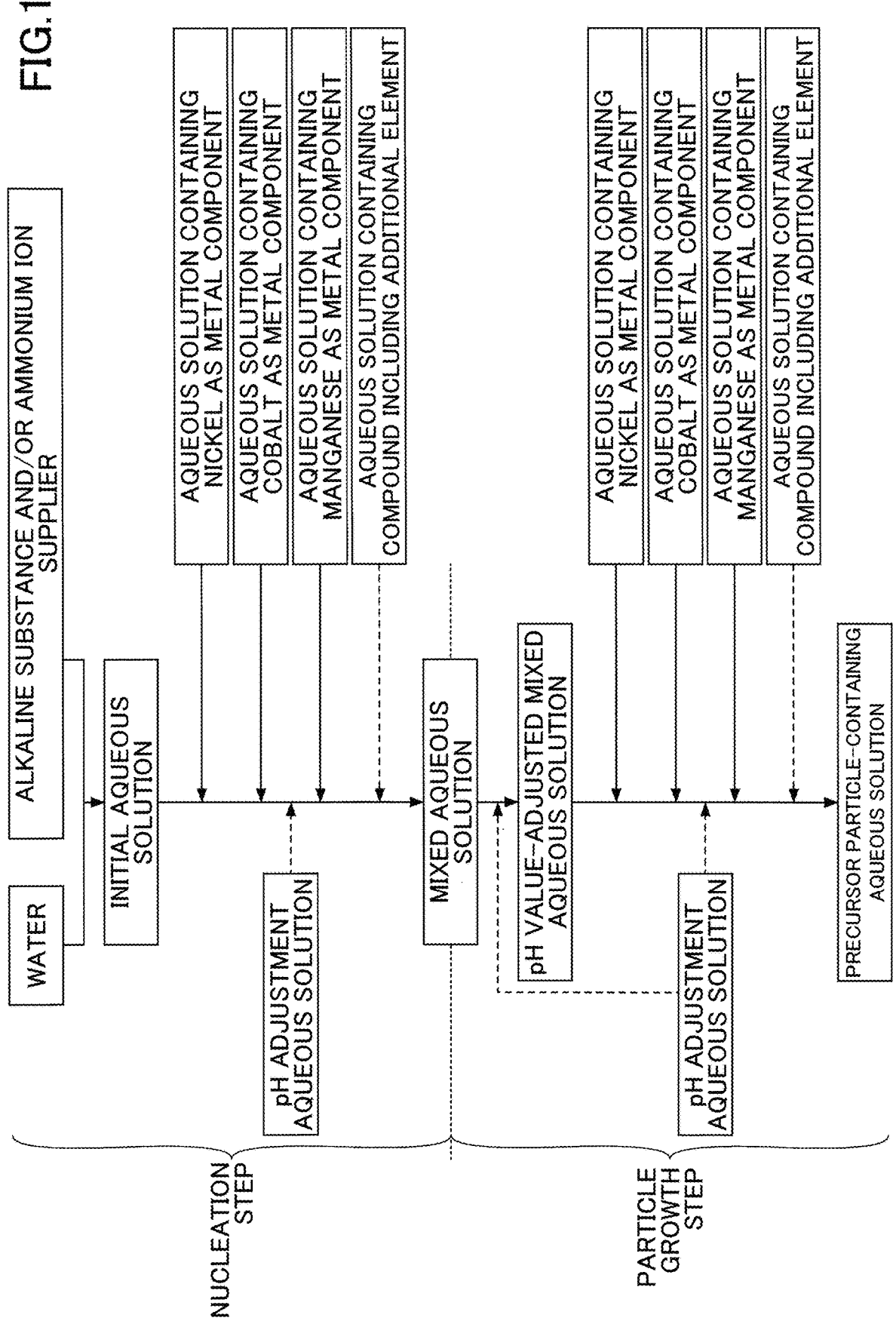
FIG. 1 is a flowchart showing a method for manufacturing a positive-electrode active material precursor for a nonaqueous electrolyte secondary battery according to an embodiment of the present invention.

In the following, embodiments of the present invention are described with reference to the accompanying drawings. Note that the present invention is by no way limited to the embodiments described below and various modifications and substitutions may be made with respect to the embodiments described below without departing from the scope of the present invention.

[Positive-Electrode Active Material Precursor for Nonaqueous Electrolyte Secondary Battery]

In the following, an example configuration of a positive-electrode active material precursor for a nonaqueous electrolyte secondary battery according to an embodiment of the present invention will be described.

The positive electrode active material precursor for a nonaqueous electrolyte secondary battery according to the present embodiment may include a nickel-cobalt-manganese carbonate composite that is represented by the general formula $Ni_xCo_yMn_zM_tCO_3$ (where $x+y+z+t=1$, $0.05 \leq x \leq 0.3$, $0.1 \leq y \leq 0.4$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W), and a hydrogen-containing functional group.

Further, H/Me representing the ratio of the amount of hydrogen H to the amount of metal components Me included in the positive-electrode active material precursor may be controlled to be greater than or equal to 1.60.

As described above, the positive electrode active material precursor for a nonaqueous electrolyte secondary battery according to the present embodiment (hereinafter also simply referred to as "precursor") may include a nickel-cobalt-manganese carbonate composite and a hydrogen-containing functional group. Note that the precursor may consist of the nickel-cobalt-manganese carbonate composite and the hydrogen-containing functional group.

The precursor according to the present embodiment may include substantially spherical secondary particles formed by aggregating a plurality of fine primary particles. The precursor may also consist of such secondary particles.

The precursor according to the present embodiment including the nickel-cobalt-manganese carbonate composite and the hydrogen-containing functional group has high particle size uniformity and fine crystals, and as such, the precursor according to the present embodiment may be used as a raw material (i.e., precursor) of a positive-electrode active material for a nonaqueous electrolyte secondary battery.

The precursor according to the present embodiment will be specifically described below.

(Composition)

As described above, the nickel-cobalt-manganese carbonate composite is a nickel-cobalt-manganese composite in basic carbonate form represented by the general formula: $Ni_xCo_yMn_zM_tCO_3$.

In the above general formula, $x+y+z+t=1$, $0.05 \leq x \leq 0.3$, $0.1 \leq y \leq 0.4$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W.

Note that the precursor according to the present embodiment may include compounds with indeterminate compositions containing carbonates and hydroxides that may be represented by general formula 1: $xMn_2(CO_3)_3 \cdot yMn(OH)_3$; general formula 2: $xCo(CO_3)_2 \cdot yCo(OH)_2 \cdot zH_2O$; general formula 3: $Ni_4CO_3(OH)_6(H_2O)_4$; and the like that are collectively represented by the above-described general formula.

When the precursor according to the present embodiment is used as a precursor of a positive-electrode active material for a nonaqueous electrolyte secondary battery, at least one additional element may be added to the nickel-cobalt-manganese carbonate composite as described above in order to further improve battery characteristics, such as cycle characteristics and output characteristics.

The at least one additional element selected from the group consisting of Mg, Ca, Al, Ti, V, Cr, Zr, Nb, Mo, and W may be contained in the nickel-cobalt-manganese carbonate composite at a predetermined atom number ratio t, and is preferably uniformly distributed inside secondary particles and/or uniformly coated on the surfaces of the secondary particles.

Note that when the atom number ratio t of the additional element in the nickel-cobalt-manganese carbonate composite exceeds 0.1, metal elements contributing to oxidation-reduction reactions (redox reactions) may potentially be reduced and the battery capacity may potentially decrease.

Even when the nickel-cobalt-manganese carbonate composite does not contain an additional element, the positive-electrode active material manufactured using the precursor according to the present embodiment may have satisfactory battery characteristics, such as cycle characteristics and output characteristics. As such, the nickel-cobalt-manganese carbonate composite does not have to contain an additional element.

Thus, the atom number ratio t of the additional element is preferably adjusted to be $0 \leq t \leq 0.1$.

As described above, the additional element may be at least one element selected from the group consisting of Mg, Ca, Al, Ti, V, Cr, Zr, Nb, Mo, and W, and in particular, the additional element preferably includes molybdenum (Mo). That is, the additional element M in the above general formula: $Ni_xCo_yMn_zM_tCO_3$ preferably includes Mo. According to studies conducted by the inventors of the present invention, the initial discharge capacity of a nonaqueous electrolyte secondary battery can be particularly increased when the nonaqueous electrolyte secondary battery uses a positive-electrode active material prepared using a precursor containing an additional element including molybdenum.

Further, the content ratio of molybdenum in the metal components Ni, Co, Mn, and the additional element M of the nickel-cobalt-manganese carbonate composite is preferably adjusted so that molybdenum constitutes at least 0.5 at % and no more than 5.0 at % of the metal components. By adjusting the content ratio of molybdenum in the metal components of the nickel-cobalt-manganese carbonate composite to be greater than or equal to 0.5 at %, the effect of increasing the initial discharge capacity of the nonaqueous electrolyte secondary battery as described above can be particularly enhanced. Also, note that molybdenum has an effect of promoting sintering during a firing process. In this respect, by adjusting the content ratio of molybdenum in the metal components of the nickel-cobalt-manganese carbonate composite to be less than or equal to 5 at %, the generation of excessively large crystals can be prevented, and an increase in resistance and a decrease in discharge capacity of a battery manufactured using the precursor can be prevented.

Further, studies conducted by the inventors of the present invention revealed that by including molybdenum in the additional element, the specific surface area of the positive-electrode active material prepared using the precursor can be reduced. That is, fine pores in the positive-electrode active material can be structurally changed into larger pores by adding molybdenum. Further, studies conducted by the inventors of the present invention revealed that by arranging the specific surface area of the positive-electrode active material to be greater than or equal to 1.5 m$^2$/g and less than or equal to 15.0 m$^2$/g, a positive-electrode mixed material paste may be easily manufactured. Thus, molybdenum is preferably included in the additional element also from the perspective of controlling the specific surface area of the positive-electrode active material to be within the above range.

Also, preferably, the additional element is uniformly distributed inside the secondary particles included in the precursor (hereinafter also simply referred to as "precursor particles") and/or uniformly coated on the surfaces of the secondary particles.

Note that the state of the additional element in the nickel-cobalt-manganese carbonate composite is not particularly limited. However, preferably, the additional element is uniformly distributed inside and/or uniformly coated on the surface of the nickel-cobalt-manganese carbonate composite as described above. That is, when the precursor according to the present embodiment is used as a precursor of a positive-electrode active material, battery characteristics can be particularly improved by having the additional element uniformly distributed inside and/or uniformly coated (distributed) on the surface of the nickel-cobalt-manganese carbonate composite.

Note that in order to sufficiently enhance the effect of improving battery characteristics even when the amount of the at least one additional element contained in the nickel-cobalt-manganese carbonate composite is substantially small, the at least one additional element is preferably distributed at a higher concentration on the surface of the carbonate composite as compared with the concentration inside the carbonate composite.

As described above, even when the amount of the at least one additional element contained in the nickel-cobalt-manganese carbonate composite is substantially small, battery characteristics can be improved and a decrease in the battery capacity can be prevented.

Also, the precursor according to the present embodiment may include the hydrogen-containing functional group as described above. Examples of the hydrogen-containing functional group include a hydrogen group, a hydroxyl group, and the like. The hydrogen-containing functional group is mixed into the precursor during the manufacturing process. The precursor according to the present embodiment is preferably adjusted so that H/Me representing the ratio of the amount of hydrogen H to the amount of metal components Me contained in the precursor is greater than or equal to 1.60. In this way, the positive-electrode active material manufactured using the precursor may be made of porous particles.

Note that the metal components Me contained in the precursor includes Ni, Co, Mn and the additional element M that are represented in the above general formula.

Also, note that while the precursor according to the present embodiment may contain a component other than the nickel-cobalt-manganese carbonate composite and the hydrogen-containing functional group, the precursor according to the present embodiment may also consist of the nickel-cobalt-manganese carbonate composite and the hydrogen-containing functional group. Note that even when the precursor of according to the present embodiment consists of the nickel-cobalt-manganese carbonate composite and the hydrogen-containing functional group, the present embodiment does not exclude the inevitable inclusion of other components during the manufacturing process and the like.

[Method for Manufacturing Positive-Electrode Active Material Precursor for Nonaqueous Electrolyte Secondary Battery]

In the following, an example method for manufacturing a positive-electrode active material precursor for a nonaqueous electrolyte secondary battery (hereinafter also simply referred to as "precursor manufacturing method") according to an embodiment of the present invention will be described.

Note that the precursor manufacturing method according to the present embodiment may be implemented to manufacture the above-described precursor, and as such, aspects of the precursor manufacturing method according to the present embodiment that have already been described above in connection with the precursor may be omitted in the description below.

In the precursor manufacturing method according to the present embodiment, a precursor can be obtained by a crystallization reaction, and the obtained precursor can be washed and dried as necessary.

Specifically, the precursor manufacturing method according to the present embodiment is a method for manufacturing a positive-electrode active material precursor for a nonaqueous electrolyte secondary battery that includes a nickel-cobalt-manganese carbonate composite represented by general formula $Ni_xCo_yMn_zM_tCO_3$ (where x+y+z+t=1, 0.05≤x≤0.3, 0.1≤y≤0.4, 0.55≤z≤0.8, 0≤t≤0.1, and M denotes at least one additional element selected from a group consisting of Mg, Ca, Al, Ti, V, Cr, Zr, Nb, Mo, and W), and a hydrogen-containing functional group. The precursor manufacturing method may include the following steps.

A nucleation step of forming nuclei in a mixed aqueous solution that is prepared by mixing together, under the presence of carbonate ions, an initial aqueous solution containing an alkaline substance and/or an ammonium ion supplier, an aqueous solution containing nickel as a metal component, an aqueous solution containing cobalt as a metal component, and an aqueous solution containing manganese as a metal component.

A particle growth step of growing the nuclei formed in the nucleation step.

The nucleation step may be performed under an oxygen-containing atmosphere while controlling the pH value of the mixed aqueous solution to be less than or equal to 7.5 at a reaction temperature of 40° C. as the standard temperature.

The example flow of the precursor manufacturing method according to the present embodiment as illustrated in FIG. 1 will be described below. In FIG. 1, the precursor manufacturing method according to the present embodiment includes: (A) a nucleation step; and (B) a particle growth step of growing the particles of the precursor using the coprecipitation method after performing the nucleation step.

In the continuous crystallization method, which is conventionally used, nucleation reaction and particle growth reaction proceed simultaneously in the same reaction tank, and as such, the obtained compound particles have a wide particle size distribution.

In contrast, the precursor manufacturing method according to the present embodiment clearly separates the time during which nucleation reaction mainly occurs (nucleation step) and the time during which particle growth reaction mainly occurs (particle growth step). In this way, precursor particles having a narrow particle size distribution may be obtained even if both steps are performed in the same reaction tank. Note that the precursor manufacturing step according to the present embodiment may further include a nucleus disintegration step that is performed between the above two steps, the nucleus disintegration step involving stopping the addition of raw materials and only performing stirring.

In the following, each step of the precursor manufacturing method according to the present embodiment will be described in detail.

(1) Nucleation Step

The nucleation step will be described with reference to FIG. 1.

As shown in FIG. 1, in the nucleation step, first, ion exchange water (water) and an alkaline substance and/or an ammonium ion supplier may be mixed together in a reaction tank to prepare an initial aqueous solution.

The ammonium ion supplier is not particularly limited but is preferably at least one type of aqueous solution selected from a group consisting of ammonium carbonate aqueous solution, ammonia water, ammonium chloride aqueous solution, and ammonium sulfate aqueous solution.

Also, the alkaline substance is not particularly limited but is preferably at least one type of substance selected from a group consisting of sodium carbonate, sodium hydrogen carbonate, potassium carbonate, sodium hydroxide, and potassium hydroxide.

In the nucleation step, the pH value of a mixed aqueous solution that is obtained by adding aqueous solutions containing metal components, such as an aqueous solution containing nickel as a metal component, to the initial aqueous solution is preferably maintained at a lower pH value than that during the particle growth step (described below). By maintaining the pH value of the mixed aqueous solution at a lower value, nuclei in the mixed aqueous solution can be reduced in size and increased in number so that the particle size of the secondary particles contained in the obtained precursor can be reduced.

In this respect, preferably, an acidic substance is added to the initial aqueous solution as necessary to adjust the pH value to be greater than or equal to 5.4 and less than or equal to 7.5, and more preferably greater than or equal to 6.4 and less than or equal to 7.4. In particular, the pH value of the initial aqueous solutions is more preferably adjusted to be greater than or equal to 6.4 and less than or equal to 7.0.

The pH value of the mixed aqueous solution is also preferably maintained to be within the above range during the nucleation step. Note that because the pH value of the mixed aqueous solution fluctuates slightly during the nucleation step, the maximum value of the pH value of the mixed aqueous solution during the nucleation step may be regarded as the pH value of the mixed aqueous solution during the nucleation step, and such pH value of the mixed aqueous solution is preferably adjusted to be within the above range.

The acidic substance is not particularly limited but sulfuric acid or the like may be preferably used, for example. The acidic substance is preferably the same type of acid as that of the metal salt used in preparing the aqueous solution containing metal components to be added to the initial aqueous solution.

Note that during the nucleation step, the pH value of the mixed aqueous solution is preferably controlled to be no more than 0.2 above or below a center value (set pH value).

In the nucleation step, by blowing an oxygen-containing gas into the reaction tank in which the initial aqueous solution is prepared to control the atmosphere within the reaction tank, the aqueous solutions containing metal components such as the aqueous solution containing nickel may be supplied to the reaction tank at a constant flow rate, and the pH value of the mixed aqueous solution may be controlled to be within a predetermined range. In this way, dissolved oxygen contained in the mixed aqueous solution and oxygen contained in the oxygen-containing gas supplied to the reaction tank may promote a reaction to form amorphous fine particles of carbonate that are not single crystals of carbonate. Also, by blowing an oxygen-containing gas into the reaction tank, the hydrogen-containing functional group may be more easily mixed into the precursor as compared with the case of performing the nucleation step in an inert gas atmosphere, and H/Me representing the ratio of the amount of hydrogen H and the amount of metal components Me contained in the obtained precursor can be controlled to be greater than or equal to 1.60.

Note that in the nucleation step, the oxygen-containing gas may continue to be supplied into the reaction tank even while the aqueous solutions containing metal components such as the aqueous solution containing nickel are added to the initial aqueous solution.

In the case of supplying an oxygen-containing gas into the reaction tank, the amount of the oxygen-containing gas to be supplied can be determined by measuring the concentration of dissolved oxygen in the mixed aqueous solution. Because dissolved oxygen in the mixed aqueous solution is consumed during the nucleation step, the amount of dissolved oxygen/oxygen supplied may be deemed sufficient for causing a reaction if the amount of dissolved oxygen in the mixed aqueous solution is at least half the saturation amount.

Note that air or the like may be used as the oxygen-containing gas, for example.

In the nucleation step, the mixed aqueous solution may be formed by adding and mixing an aqueous solution containing nickel as a metal component, an aqueous solution containing cobalt as a metal component, and an aqueous solution containing manganese as a metal component into the initial aqueous solution in the reaction tank.

When adding the aqueous solutions containing metal components such as the aqueous solution containing nickel to the initial aqueous solution, the pH value of the mixed aqueous solution to be obtained is preferably controlled to be less than or equal to 7.5 at a reaction temperature of 40° C. as the standard temperature. The pH value is more preferably controlled to be less than or equal to 7.4, and still more preferably less than or equal to 7.0. In this respect, preferably, the aqueous solution containing a metal component, such as the aqueous solution containing nickel, is gradually added dropwise into the initial aqueous solution rather than being added at once.

Also, in order to control the pH value of the mixed aqueous solution, when dropping the aqueous solutions containing metal components such as the aqueous solution containing nickel, a pH adjustment aqueous solution may also be dropped into the initial aqueous solution along with the aqueous solutions containing metal components. The pH adjustment aqueous solution to be used is not particularly limited, but for example, an aqueous solution containing an alkaline substance and/or an ammonium ion supplier may be used. Note that the alkaline substance and the ammonium ion supplier are not particularly limited, but the same substances as those described in the initial aqueous solution can be used, for example. The method of supplying the pH adjustment aqueous solution into the reaction tank is not particularly limited, but for example, while stirring the obtained mixed aqueous solution, the pH adjustment aqueous solution may be added using a pump capable of flow rate control, such as a metering pump, so that the pH value can be maintained within a predetermined range.

Then, particles that constitute nuclei of the precursor are formed in the mixed aqueous solution obtained by adding the aqueous solutions containing metal components such as the aqueous solution containing nickel to the initial aqueous solution as described above. Note that whether a predetermined amount of nuclei has been formed in the mixed aqueous solution can be determined based on the amount of metal salt contained in the mixed aqueous solution.

In the following, the aqueous solution containing nickel as a metal component, the aqueous solution containing cobalt as a metal component, and the aqueous solution containing manganese as a metal component that are added to the initial aqueous solution in the nucleation step will be described.

The aqueous solution containing nickel as a metal component, the aqueous solution containing cobalt as a metal component, and the aqueous solution containing manganese as a metal component may each contain a metal compound including the corresponding metal component. That is, for example, the aqueous solution containing cobalt as a metal component may contain a metal compound including cobalt.

As the metal compound, a water-soluble metal compound is preferably used, and examples of the water-soluble metal compound include nitrates, sulfates, hydrochlorides and the like. Specifically, for example, nickel sulfate, cobalt sulfate, manganese sulfate or the like can be suitably used.

The aqueous solution containing nickel as a metal component, the aqueous solution containing cobalt as a metal component, and the aqueous solution containing manganese as a metal component may be mixed together, in part or entirely, to form a metal component-containing mixed aqueous solution, and the resulting metal component-containing mixed aqueous solution may be added to the initial aqueous solution.

The composition ratios of the respective metals in the obtained precursor will be the same as the composition ratios of the respective metals in the metal component-containing mixed aqueous solution. As such, for example, the metal component-containing mixed aqueous solution is preferably prepared by adjusting the ratios of the respective metal compounds to be dissolved in the aqueous solution so that the composition ratios of the respective metals contained in the metal component-containing mixed aqueous solution to be added to the initial aqueous solution in the nucleation step can be controlled to be equal to the composition ratios of the respective metals in the precursor to be produced.

Note that in the case where certain metal compounds may react with each other to produce an unnecessary compound when a plurality of metal compounds are mixed together, the aqueous solutions containing the respective metal components may be simultaneously added to the initial aqueous solution at predetermined ratios.

When the aqueous solutions containing the respective metal components are not mixed together and are separately added to the initial aqueous solution, the aqueous solutions containing the respective metal components are preferably prepared by controlling the composition ratios of the respective metals in the entire aqueous solution containing the respective metal components to be added to be equal to the composition ratios of the respective metals in the precursor to be produced.

As described above, the precursor to be manufactured by the precursor manufacturing method according to the present embodiment may include a nickel-cobalt-manganese carbonate composite represented by general formula $Ni_xCo_yMn_zM_tCO_3$ (where $x+y+z+t=1$, $0.05 \leq x \leq 0.3$, $0.1 \leq y \leq 0.4$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W), and a hydrogen-containing functional group.

That is, the precursor may further include an additional element other than nickel, cobalt, and manganese.

As such, in the nucleation step, an aqueous solution (hereinafter also simply referred to as "additional-element-containing aqueous solution") containing at least one additional element selected from the group consisting of Mg, Ca, Al, Ti, V, Cr, Zr, Nb, Mo, and W (hereinafter also simply referred to as "additional element") may also be added to the initial aqueous solution. As described above, the additional element preferably contains Mo, and as such, an aqueous solution containing at least molybdenum as a metal component is preferably used as the aqueous-solution-containing aqueous solution.

Note that in the case where aqueous solutions containing metal compounds, such as the aqueous solution containing nickel as the metal component and the like, are mixed together to prepare a metal component-containing mixed aqueous solution to be added to the initial aqueous solution, the additional-element-containing aqueous solution may also be added to and mixed with the metal component-containing mixed aqueous solution.

Also, in the case where aqueous solutions containing metal compounds, such as the aqueous solution containing nickel and the like, are not mixed together and are separately added to the initial aqueous solution, the additional-element-containing aqueous solution may also be separately added to the initial aqueous solution along with the aqueous solutions containing metal components.

The additional-element-containing aqueous solution may be prepared using, for example, a compound containing the additional element. Examples of the compound containing the additional element include titanium sulfate, ammonium peroxotitanate, potassium titanium oxalate, vanadium sulfate, ammonium vanadate, chromium sulfate, potassium chromate, zirconium sulfate, zirconium nitrate, niobium oxalate, ammonium molybdenum acid, sodium tungstate, ammonium tungstate, and the like. The compound to be added can be selected according to the additional element to be added.

As described above, the additional element is preferably uniformly distributed within the nucleus particles contained in the precursor and/or uniformly coated on the surfaces of the nucleus particles contained in the precursor.

By adding the above-described additional-element-containing aqueous solution to the mixed aqueous solution, the additional element can be uniformly dispersed within the nucleus particles contained in the precursor.

Further, in order to uniformly coat the additional element on the surfaces of the secondary particles of the precursor, for example, a coating step of coating the surfaces with the additional element may be performed after the particle growth step (described below) is completed. The coating step will be described below in connection with the particle growth step.

In the nucleation step, an aqueous solution containing nickel as a metal component and the like may be added to and mixed with an initial aqueous solution under the presence of carbonate ions to form a mixed aqueous solution so that nuclei may be formed in the mixed aqueous solution. Note that the method of supplying carbonate ions in the above step is not particularly limited, but for example, the carbonate ions may be supplied to the mixed aqueous solution by supplying carbon dioxide into the reaction tank together with the oxygen-containing gas as described below. The carbonate ions may also be supplied using a carbonate salt when preparing the initial aqueous solution or the pH adjustment aqueous solution, for example.

As described above, in the nucleation step, an aqueous solution containing nickel as a metal component and the like may be added to and mixed with an initial aqueous solution under the presence of carbonate ions to form a mixed aqueous solution so that nuclei may be formed in the mixed aqueous solution.

In this case, the concentration of metal compounds in the mixed aqueous solution is preferably greater than or equal to 1 mol/L and less than or equal to 2.6 mol/L, and more preferably greater than or equal to 1.5 mol/L and less than or equal to 2.2 mol/L.

This is because when the concentration of the metal compounds in the mixed aqueous solution is less than 1 mol/L, the amount of crystallization per reaction tank is reduced such that productivity is decreased. On the other hand, when the concentration of the metal compounds in the mixed aqueous solution exceeds 2.6 mol/L, the concentration of the metal compounds may exceed the saturation concentration at ordinary temperature such that crystals may be reprecipitated and clog the piping of equipment, for example.

Note that the concentration of the metal compounds refers to the concentration of the metal compounds derived from the aqueous solutions added to the mixed aqueous solution, including the aqueous solution containing nickel as a metal component, the aqueous solution containing cobalt as a metal component, the aqueous solution containing manganese as a metal component, and, in some cases, the additional-element-containing aqueous solution.

In the nucleation step, the temperature of the mixed aqueous solution is preferably maintained to be greater than or equal to 20° C., and or more preferably greater than or equal to 30° C. Note that although the upper limit for the temperature of the mixed aqueous solution in the nucleation step is not particularly limited, for example, the temperature is preferably maintained to be less than or equal to 70° C., and or more preferably less than or equal to 50° C.

This is because when the temperature of the mixed aqueous solution in the nucleation step is less than 20° C., nucleation may easily occur due to low solubility of the mixed aqueous solution such that controllability may be compromised.

On the other hand, when the temperature of the mixed aqueous solution in the nucleation step exceeds 70° C., distortion may occur in primary crystals and tap density may be decreased.

In the nucleation step, the ammonium ion concentration in the mixed aqueous solution is not particularly limited, but for example, the ammonium ion concentration is preferably greater than or equal to 0 g/L and less than or equal to 20 g/L, and is more preferably maintained at a constant value.

Note that the pH value in the mixed aqueous solution, the ammonium ion concentration, the amount of dissolved oxygen, and the like may be measured by a general pH meter, an ion meter, a dissolved oxygen meter, respectively.

After completing the nucleation step, i.e., after adding the metal component-containing mixed aqueous solution and the like to the initial aqueous solution, stirring of the mixed aqueous solution is continued and a process of disintegrating the generated nuclei is preferably performed (nucleus disintegration step). In the case of performing the nucleus disintegration step, the process is preferably performed for at least 1 minute, and more preferably for at least 3 minutes. By performing the nucleus disintegration step, aggregation of the generated nuclei, enlargement of the particle diameter, and density decrease of the particles may be more reliably prevented.

(2) Particle Growth Step

In the following, the particle growth step will be described with reference to FIG. 1.

In the particle growth step, nuclei generated in the nucleation step can be grown.

Specifically, for example, as shown in FIG. 1, in the particle growth step, the pH value of the mixed aqueous solution obtained in the nucleation step can be adjusted.

For example, the pH value of the mixed aqueous solution may be adjusted to be greater than or equal to 6.0 and less than or equal to 9.0 at a reaction temperature of 40° C. as the standard temperature. The pH value of the mixed aqueous solution is more preferably adjusted to be greater than or equal to 6.4 and less than or equal to 8.0, and more preferably greater than or equal to 7.1 and less than or equal to 8.0. The pH value of the mixed aqueous solution can be adjusted by adding a pH adjustment solution as described below, for example.

Note that by adjusting the pH value of the mixed aqueous solution to be greater than or equal to 6.0 and less than or equal to 9.0, cation impurities may be prevented from remaining in the mixed aqueous solution.

The particle growth step may include a step of adding and mixing an aqueous solution containing nickel as a metal component, an aqueous solution containing cobalt as a metal component, and an aqueous solution containing manganese as a metal component into the mixed aqueous solution obtained after the nucleation step, under the presence of carbonate ions.

Note that the mixed aqueous solution obtained after the nucleation step is preferably a pH value-adjusted mixed aqueous solution that has undergone pH adjustment after the nucleation step as described above.

Also, the aqueous solution containing nickel as a metal component, the aqueous solution containing cobalt as a metal component, and the aqueous solution containing manganese as a metal component may be mixed together, in part or entirely, in the same manner as in the nucleation step, to form a metal component-containing mixed aqueous solution, and the resulting metal component-containing mixed aqueous solution may be added to the mixed aqueous solution. In the case where certain metal compounds may react with each other to produce an unnecessary compound when a plurality of metal compounds are mixed together, the aqueous solutions containing the respective metal components may be separately added to the mixed aqueous solution.

Further, when adding the aqueous solution containing nickel as a metal component and the like to the mixed aqueous solution, an additional element-containing aqueous solution may also be added along with the aqueous solutions containing metal components as in the nucleation step. Also, the additional element-containing aqueous solution may be added to and mixed with the metal component-containing mixed aqueous solution as described above. Also, in the case where the aqueous solutions containing the respective metal components are separately added to the mixed aqueous solution, the additional element-containing aqueous solution may also be separately added to the mixed aqueous solution.

The aqueous solution containing nickel as a metal component, the aqueous solution containing cobalt as a metal component, and the aqueous solution containing manganese as a metal component that are used in the particle growth step may be the same aqueous solutions as those used in the nucleation step. Also, concentration adjustment and the like may be separately performed on the aqueous solutions containing the respective metal components, for example.

When adding the aqueous solution containing nickel as a metal component and the like to the mixed aqueous solution, the pH value of the obtained mixed aqueous solution is preferably controlled to be within a predetermined range as described below. In this respect, the aqueous solution containing nickel as a metal component and the like may be gradually added dropwise into the mixed aqueous solution rather than being added at once. For example, the aqueous solutions containing the metal components or the metal component-containing mixed aqueous solution may be supplied to the reaction tank at a constant flow rate.

In the particle growth step, an aqueous solution containing a metal component, such as an aqueous solution containing nickel and the like, may be added to the pH value-adjusted mixed aqueous solution as described above. In this step, the pH value of the mixed aqueous solution to be obtained is preferably controlled to be to be within the same range as that for the pH value-adjusted mixed aqueous solution, i.e., greater than or equal to 6.0 and less than or equal to 9.0, more preferably greater than or equal to 6.4 and less than or equal to 8.0, and still more preferably greater than or equal to 7.1 and less than or equal to 8.0. The pH value of the mixed aqueous solution is adjusted in the above manner for the same reason as that for adjusting the pH value before starting the particle growth step.

By controlling the pH value of the mixed aqueous solution to be within the above range in the particle growth step, a precursor with a small amount of residual impurities may be obtained.

Note that because the pH value of the mixed aqueous solution fluctuates slightly during the particle growth step, the maximum value of the pH value of the mixed aqueous solution during the particle growth step may be regarded as the pH value of the mixed aqueous solution during the particle growth step, and such pH value of the mixed aqueous solution is preferably controlled to be within the above range.

In particular, the fluctuation range of the pH value of the mixed aqueous solution is preferably controlled to be within 0.2 above or below a center value (set pH value) during the particle growth step. When the fluctuation range of the pH value of the mixed aqueous solution is exceeds the above range, the growth of particles contained in the precursor may not be constant, and uniform particles with a narrow particle size distribution may not be obtained.

When supplying the aqueous solutions containing metal components or the metal component-containing mixed aqueous solution as described above, a pH adjustment aqueous solution is preferably supplied along with the aqueous solutions containing metal components or the metal component-containing mixed aqueous solution so that the pH of the mixed aqueous solution can be maintained within a predetermined range. The pH adjustment aqueous solution used in the particle growth step may be the same as the pH adjustment aqueous solution used in the nucleation step.

The pH adjustment aqueous solution used is not particularly limited, but for example, an aqueous solution containing an alkaline substance and/or an ammonium ion supplier may be used. Note that the alkaline substance and the ammonium ion supplier are not particularly limited, but the same substances as those that may be used in the initial aqueous solution may be used, for example. The method of supplying the pH adjustment aqueous solution into the reaction tank is not particularly limited, but for example, while sufficiently stirring the obtained mixed aqueous solution, the pH adjustment aqueous solution may be added using a pump capable of flow rate control, such as a metering pump, so that the pH value can be maintained within a predetermined range.

In the particle growth step, the ammonium ion concentration in the mixed aqueous solution is preferably controlled to be greater than or equal to 0 g/L and less than or equal to 20 g/L, and is more preferably maintained at a constant value.

By controlling the ammonium ion concentration to be less than or equal to 20 g/L, nuclei of precursor particles may be homogeneously grown. Also, by maintaining the ammonium ion concentration at a constant value in the grain growth step, the solubility of metal ions can be stabilized and uniform growth of the precursor particles can be promoted.

Note that the lower limit of the ammonium ion concentration is not particularly limited and can be adjusted to a suitable value as necessary. Accordingly, the ammonium ion concentration in the mixed aqueous solution is preferably adjusted to be greater than or equal to 0 g/L and less than or equal to 20 g/L by adjusting the amount of ammonium ion supplier supplied to the initial aqueous solution and/or the pH adjustment aqueous solution, for example.

In the particle growth step, an aqueous solution containing a metal component such as an aqueous solution containing nickel may be added and mixed into the mixed aqueous solution under the presence of carbonate ions. In this step, the method of supplying carbonate ions is not particularly limited, but for example, carbon dioxide may be supplied to the mixed aqueous solution by supplying carbon dioxide gas together with an oxygen-containing gas into the reaction tank as described below. The carbonate ions may also be supplied using a carbonate salt when preparing the initial aqueous solution or the pH adjustment aqueous solution, for example.

In the particle growth step, an aqueous solution containing a metal component such as an aqueous solution containing nickel as a metal component may be supplied at a constant flow rate, for example, while an oxygen-containing gas is blown into the reaction tank to control the atmosphere in the reaction tank to be an oxygen-containing atmosphere. In this way, dissolved oxygen contained in the mixed aqueous solution and oxygen contained in the oxygen-containing gas supplied to the reaction tank may promote a reaction so that amorphous fine particles which are not single crystals of carbonate may be further aggregated to form large secondary particles. Also, by blowing an oxygen-containing gas into the reaction tank, a hydrogen-containing functional group may be more easily mixed with the precursor as compared with the case of performing the particle growth step in an inert gas atmosphere, and H/Me representing the ratio of the amount of hydrogen H to the amount of metal components Me contained in the resulting precursor may be controlled to be greater than or equal to 1.60.

In the case of supplying the oxygen-containing gas into the reaction tank in the particle growth step, the amount of the oxygen-containing gas to be supplied may be determined by measuring the concentration of dissolved oxygen in the mixed aqueous solution. Because dissolved oxygen in the mixed aqueous solution is consumed during the particle growth step, the amount of dissolved oxygen/oxygen supplied may be deemed sufficient for promoting a reaction if the amount of dissolved oxygen in the mixed aqueous solution is more than half the saturation amount.

Note that air may be used as the oxygen-containing gas, for example.

The particle diameter of the secondary particles contained in the precursor may be controlled by controlling the reaction time in the particle growth step.

That is, in the particle growth step, if a reaction is continued until particles are grown to a desired particle size, a precursor having secondary particles of a desired particle size can be obtained.

After the precursor is obtained in the grain growth step, the obtained precursor may be further subjected to a coating step of coating the additional element on the surfaces of the precursor particles as described above. That is, the precursor manufacturing method according to the present embodiment may further include a coating step of coating the additional element over the particles (secondary particles) of the precursor obtained in the particle growth step.

The coating step may be implemented by one of the following process steps, for example.

For example, the coating step may be a process step that involves adding the additional element-containing aqueous solution to a slurry containing suspended precursor particles, and precipitating the additional element on the surfaces of the precursor particles by a crystallization reaction.

In preparing the slurry containing the suspended precursor particles, the precursor particles are preferably turned into a slurry using the additional element-containing aqueous solution. Also, when adding the additional element-containing aqueous solution to the slurry containing the suspended precursor particles, the pH value of a mixed aqueous solution obtained by mixing together the slurry and the additional element-containing aqueous solution is preferably controlled to be greater than or equal to 6.0 and less than or equal to 9.0. By controlling the pH value of the mixed aqueous solution of the slurry and the additional element-containing aqueous solution to be within the above range, the surfaces of the precursor particles can be uniformly coated with the additional element.

Also, the coating step may be a process step that involves spraying the additional element-containing aqueous solution or a slurry onto the precursor particles and drying the precursor particles, for example.

The coating step may also be a process step that involves spray drying a slurry containing suspensions of the precursor particles and a compound containing the additional element.

The coating step may also be a process step that involves mixing together the precursor particles and a compound containing the additional element by a solid phase method, for example.

Note that the additional element-containing aqueous solution used in the coating step may be the same as the additional element-containing aqueous solution used in the nucleation step. Also, in the coating step, an alkoxide solution containing the additional element may be used instead of the additional element-containing aqueous solution, for example.

In the case where the additional element-containing aqueous solution is added to the initial aqueous solution and/or the mixed aqueous solution in the nucleation step and/or the particle growth step as described above, and the coating step is performed to coat the surfaces of the precursor particles with the additional element, the amount of additional element ions to be added to the initial aqueous solution and/or the mixed aqueous solution in the nucleation step and/or the particle growth step is preferably reduced by the amount of additional element to be coated on the precursor particles. By reducing the amount of the additional element-containing aqueous solution to be added to the mixed aqueous solution by the amount of the additional element to be coated on the precursor particles, the atom number ratio of the additional element contained in the precursor with respect to the other metal components contained in the precursor can be controlled to a desired value.

Note that the coating step of coating the surfaces of the precursor particles with the additional element as described above may be performed on the precursor particles that have been heated after completion of the particle growth step.

The precursor manufacturing method according to the present embodiment is preferably implemented by an apparatus that does not collect the precursor corresponding to the reaction product until reactions from the nucleation step to the particle growth step are completed. An example of such an apparatus includes a commonly used batch reaction tank equipped with a stirrer and the like. By using such an apparatus, problems associated with growing particles being collected along with overflow fluid (problems encountered in conventional continuous crystallization apparatuses that collect products using overflow fluid) may be avoided, and in this way, particles having a narrow particle size distribution and uniform particle size can be obtained.

Also, an apparatus that is capable of controlling the atmosphere, such as a sealed apparatus, is preferably used so that the atmosphere of the reaction tank can be controlled.

By using an apparatus that is capable of controlling the atmosphere of the reaction tank, particles contained in the precursor may be controlled to have the configurations as described above and a substantially uniform coprecipitation reaction may be promoted. In this way, particles having a desirable particle size distribution, i.e., particles having a narrow particle size distribution, can be obtained.

In the particle growth step, the pH value of the mixed aqueous solution obtained in the nucleation step may be adjusted to be within a predetermined range, and an aqueous solution containing a metal component such as an aqueous solution containing nickel may be further added to the mixed aqueous solution to obtain uniform precursor particles.

By performing the above particle growth step, a precursor particle-containing aqueous solution corresponding to a slurry containing precursor particles may be obtained. After the particle growth step is completed, a washing step and a drying step may be performed.

(3) Washing Step

In the washing step, the slurry containing the precursor particles obtained in the particle growth step described above can be washed.

In the washing step, a slurry containing precursor particles is filtered, washed with water, and filtered again.

The filtration may be performed by a conventional technique using a centrifuge or a suction filtering machine, for example.

Also, the washing with water may be performed by a conventional method that can remove excess raw materials and the like contained in the precursor particles.

The water used in the washing step is preferably water containing a minimum amount of impurities in order to prevent impurity contamination, and more preferably, purified water is used.

(4) Drying Step

In the drying step, the precursor particles washed in the washing step can be dried.

For example, in the drying step, the precursor particles can be dried at a drying temperature that is adjusted to be greater than or equal to 80° C. and less than or equal to 230° C.

After the drying step, a precursor can be obtained.

In the precursor manufacturing method according to the present embodiment, a precursor that is capable forming a positive-electrode active material for a nonaqueous electrolyte secondary battery containing porous particles can be obtained.

Also, in the precursor manufacturing method according to the present embodiment, the time during which nucleation reaction mainly occurs (nucleation step) and the time during which particle growth reaction mainly occurs (particle growth step) are clearly separated such that precursor particles (secondary particles) having a narrow particle size distribution may be obtained even if both steps are carried out in the same reaction tank.

Also, in the precursor manufacturing method according to the present embodiment, the crystal size of the precursor particles obtained during the crystallization reaction can be controlled.

Thus, in the precursor manufacturing method according to the present embodiment, a precursor with primary particles having small particle diameters and secondary particles having particle diameter uniformity and high density (tap density) can be obtained.

Also, in the precursor manufacturing method according to the present embodiment, the nucleation step and the particle growth step can be separately performed in one reaction tank by simply adjusting the pH value of the reaction solution. As such, the precursor manufacturing method according to the present embodiment may have substantial industrial value in that it can be easily implemented and is suitable for large-scale production.

[Positive-Electrode Active Material for Nonaqueous Electrolyte Secondary Battery]

In the following, an example configuration of a positive-electrode active material for a nonaqueous electrolyte secondary battery (hereinafter also simply referred to as "positive-electrode active material") according to an embodiment of the present invention will be described.

The positive-electrode active material according to the present embodiment corresponds to a positive-electrode active material for a nonaqueous electrolyte secondary battery including a lithium metal composite oxide.

The lithium metal composite oxide is represented by general formula $Li_{1+a}Ni_xCo_yMn_zM_tO_2$ (where $0.25 \le a \le 0.55$, $x+y+z+t=1$, $0.05 \le x \le 0.3$, $0.1 \le y \le 0.4$, $0.55 \le z \le 0.8$, $0 \le t \le 0.1$, and M denotes at least one additional element selected from a group consisting of Mg, Ca, Al, Ti, V, Cr, Zr, Nb, Mo, and W).

The positive-electrode active material according to the present embodiment contains porous secondary particles that are aggregations of a plurality of primary particles. The internal porosity of the secondary particles is greater than or equal to 10% and less than or equal to 30%, and the ratio of the number of secondary particles (with respect to the total number of particles) is greater than or equal to 80%.

The positive-electrode active material according to the present embodiment may include a lithium metal composite oxide formed by the solution of two types layered compounds represented by formulas $Li_2M1O_3$ and $LiM2O_2$, more specifically, a lithium-rich nickel-cobalt-manganese composite oxide. The positive-electrode active material according to the present embodiment may also consist of the above lithium metal composite oxide.

In the above formulas, M1 denotes metal elements including at least Mn that are adjusted to be tetravalent on average, and M2 denotes metal elements including at least Ni, Co, and Mn that are adjusted to be trivalent on average.

It is assumed that the composition ratios of Ni, Co, and Mn in the precursor as described above determine the composition of M1+M2. Also, because the above lithium metal composite oxide is a lithium-rich metal composite oxide, the presence ratios of $Li_2M1O_3$ and $LiM2O_2$ are adjusted so that the presence ratio of $Li_2M1O_3$ is not 0%.

As described above in connection with the precursor, in order to further improve battery characteristics, such as cycle characteristics and output characteristics, of the positive-electrode active material for the nonaqueous electrolyte secondary battery, the lithium metal composite oxide may also contain at least one additional element selected from the group consisting of Mg, Ca, Al, Ti, V, Cr, Zr, Nb, Mo, and W. Also, for the reasons described above in connection with the precursor, the amount of additional element contained in the lithium metal composite oxide is preferably adjusted so that the atom number ratio t of the additional element M in the lithium metal composite oxide is within the range of $0 \le t \le 0.1$.

As described above, the additional element may be at least one element selected from the group consisting of Mg, Ca, Al, Ti, V, Cr, Zr, Nb, Mo, and W. In particular, the additional element preferably includes molybdenum (Mo). That is, in the above general formula $Li_{1+a}Ni_xCo_yMn_zM_tO_2$, the additional element M preferably includes Mo. According to studies conducted by the inventors of the present invention, when the positive-electrode active material contains molybdenum as an additional element, the initial discharge capacity of a battery using the positive-electrode active material can be particularly increased.

Further, in the lithium metal composite oxide, the content ratio of molybdenum in the metal components other than Li of the lithium metal oxide, i.e., the metal components Ni, Co, Mn, and the additional element M, is adjusted to be greater than or equal to 0.5 at % and less than or equal to 5 at %. By controlling the content ratio of molybdenum in the metal components other than Li of the lithium metal composite oxide to be greater than or equal to 0.5 at %, the above-described effect of increasing the initial discharge capacity can be particularly enhanced. Also, although molybdenum has an effect of promoting sintering during a firing process, by controlling the content of molybdenum in the metal components other than Li of the lithium metal composite oxide to be less than or equal to 5 at %, generation of excessively large crystals may be prevented such that an increase in resistance and a decrease in discharge capacity of a battery fabricated using the precursor can be reliably prevented.

Further, studies conducted by the inventors of the present invention revealed that by including molybdenum in the additional element, the specific surface area of the positive-electrode active material prepared using the precursor can be reduced. This is because by adding molybdenum, fine pores in the positive-electrode active material may be structurally changed to larger pores. Further, according to studies conducted by the inventors of the present invention, by controlling the specific surface area of the positive-electrode active material to be greater than or equal to 1.5 $m^2/g$ and less than or equal to 15.0 $m^2/g$, a positive electrode mixed material paste may be easily manufactured and output characteristics may be increased. Thus, molybdenum is preferably included in the additional element also from the perspective of controlling the specific surface area to be within the above range.

The positive-electrode active material according to the present embodiment includes secondary particles having porous structures with uniform fine pores extending into their cores. By arranging the secondary particles to have such a porous structure, the reaction surface area can be increased. Also, an electrolytic solution can permeate through particle boundaries between primary particles or the fine pores at the outer shell portion into the particle interior to enable lithium insertion/deinsertion even at a reaction interface inside the particle so that movement of Li ions and electrons may be undisturbed and output characteristic may be enhanced.

In the positive-electrode active material according to the present embodiment, the porosity of the secondary particles is preferably greater than or equal to 10% and less than or equal to 30%. Also, the ratio of the number of such porous secondary particles having uniform fine pores included in the positive-electrode active material (with respect to the total number of particles) is preferably greater than or equal to 80%. Note that the porosity of the porous secondary particles may be obtained by observing a cross-sectional structure of the positive-electrode active material using a scanning electron microscope (SEM) and calculating the porosity through image processing, for example. Also, the number ratio of the porous secondary particles may be obtained by observing cross-sectional structures of a plurality of (e.g., 100) secondary particles of the positive-electrode active material using a SEM, for example, and counting the number of secondary particles having porous structures with fine pores extending into their cores.

By arranging the positive-electrode active material according to the present embodiment to have a porous structure, the specific area of the positive-electrode active material may be increased. The specific surface area of the positive-electrode active material according to the present embodiment is not particularly limited and may be selectively determined based on the required characteristics of the positive-electrode active material. For example, the specific surface area of the positive-electrode active material is preferably greater than or equal to 1.5 $m^2/g$. By arranging the specific surface area of the positive-electrode active material to be greater than or equal to 1.5 $m^2/g$, a positive electrode mixed material paste may be easily manufactured and output characteristics may be increased.

Also, the upper limit of the specific surface area of the positive-electrode active material is not particularly limited, but for example, the specific surface area is preferably arranged to be less than or equal to 15.0 $m^2/g$, and more preferably less than or equal to 13.0 $m^2/g$.

Note that when an increase in the reaction surface area and an increase in the output characteristics are particularly desired, the specific surface area of the positive-electrode active material according to the present embodiment is preferably arranged to be greater than or equal to 5.0 $m^2/g$ and less than or equal to 15.0 $m^2/g$. Also, when facilitation of the manufacture of a positive-electrode mixed material paste is particularly desired, the specific surface area of the positive-electrode active material according to the present embodiment is preferably arranged to be greater than or equal to 1.5 $m^2/g$ and less than or equal to 8.0 $m^2/g$.

Also, by arranging the positive-electrode active material according to the present embodiment to have a porous structure, output characteristics of a battery formed using the positive-electrode active material may be increased and the tap density of the positive-electrode active material may be increased.

The tap density of the positive-electrode active material according to the present embodiment is not particularly limited but is preferably greater than or equal to 1.7 g/cc, and more preferably greater than or equal to 1.8 g/cc.

The positive-electrode active material according to the present embodiment preferably has a high initial discharge capacity that is greater than or equal to 250 mAh/g when used as a positive-electrode of a 2032-type coin battery, for example. Also, the discharge capacity under a high discharge rate condition (2C) is preferably greater than or equal to 195 mAh/g.

Note that the discharge capacity under the above high discharge rate condition (2C) may be obtained by measuring the discharge capacity under the 2C discharge rate a plurality of times (e.g., three times) and calculating an average value of the plural measurements, for example.

[Method for Manufacturing Positive-Electrode Active Material for Nonaqueous Electrolyte Secondary Battery]

In the following, an example method for manufacturing a positive-electrode active material for a nonaqueous electrolyte secondary battery (hereinafter also simply referred to as "positive-electrode active material manufacturing method") according to an embodiment of the present invention will be described.

Although the positive-electrode active material manufacturing method according to the present embodiment is not particularly limited as long as a positive-electrode active material having the above-described particle structure can be manufactured, the following method may preferably be used to reliably manufacture the positive-electrode active material.

For example, the positive-electrode active material manufacturing method according to the present embodiment may include the following steps.

A heat treatment step of heat-treating the positive-electrode active material precursor for a nonaqueous electrolyte secondary battery obtained by the above-described method for manufacturing a positive-electrode active material precursor for a nonaqueous electrolyte secondary battery at a temperature greater than or equal to 80° C. and less than or equal to 600° C.

A mixing step of adding and mixing a lithium compound into the particles obtained by the heat treatment step to form a lithium mixture.

A firing step of firing the lithium mixture in an oxidizing atmosphere at a temperature greater than or equal to 600° C. and less than or equal to 1000° C.

In the following, each of the above steps will be described.

(1) Heat Treatment Step

In the heat treatment step, the above-described precursor may be heat-treated at a temperature greater than or equal to 80° C. and less than or equal to 600° C. By performing the heat treatment, moisture contained in the precursor can be removed, and variations in the ratios of the number of metal atoms and the number of lithium atoms in the positive-electrode active material to be ultimately obtained can be prevented.

Note that the moisture removal may be performed to the extent necessary to prevent variations in the ratios of the number of metal atoms and the number of lithium atoms in the positive-electrode active material. As such, it may not be necessary to convert all the precursor particles into nickel-cobalt-manganese composite oxide. However, in order to further reduce the variations in the atom number ratios, the heat treatment temperature is preferably arranged to be greater than or equal to 500° C., and all the precursor particles are preferably converted into composite oxide particles.

Note that the heat treatment temperature is arranged to be greater than or equal to 80° C. in the heat treatment step because excessive moisture in the precursor particles may not be adequately removed and variations in the atom number ratios may not be adequately prevented if the heat treatment temperature is lower than 80° C.

On the other hand, the heat treatment temperature is arranged to be less than or equal to 600° C. in the heat treatment step because particles may be sintered due to burning and composite oxide particles with uniform particle diameters may not be obtained if the heat treatment temperature is above 600° C.

By determining the metal components contained in the precursor particles corresponding to the heat treatment conditions through analysis in advance and determining the ratio of the metal compounds to the lithium compound, the above-described variations may be prevented.

The heat treatment atmosphere is not particularly limited as long as the heat treatment is performed in a non-reducing atmosphere, but for example, the heat treatment step can be conveniently performed in an airflow.

Although the heat treatment time is not particularly limited, the heat treatment is preferably performed for at least 1 hour, and more preferably for at least 2 hours and no more than 15 hours. Note that if the heat treatment is performed for less than 1 hour, excessive moisture in the precursor particles may not be adequately removed.

The equipment used for the heat treatment is not particularly limited as long as the precursor particles can be heated in a non-reducing atmosphere, preferably in an airflow. For example, an electric furnace that does not generate gas may preferably be used.

(2) Mixing Step

In the mixing step, a lithium compound is added to and mixed with the heat-treated particles obtained by heating the precursor particles in the heat treatment step to form a lithium mixture.

Note that the heat-treated particles obtained by heating the precursor particles in the heat treatment step include nickel-cobalt-manganese carbonate composite particles and/or nickel-cobalt-manganese composite oxide particles.

The heat-treated particles and the lithium compound are preferably mixed together such that, provided Li/Me represents the ratio of the number of lithium atoms (Li) to the number of atoms constituting the metal components other than lithium in the lithium mixture, i.e., the total number of atoms of nickel, cobalt, manganese, and the additional element M (Me) in the lithium mixture, Li/Me is greater than or equal to 1.1 and less than or equal to 1.8. More preferably, the heat-treated particles and the lithium compound are mixed together such that the ratio Li/Me is greater than or equal to 1.3 and less than or equal to 1.5.

That is, because no change occurs in the ratio Li/Me before and after the firing step, the ratio Li/Me in the lithium mixture obtained in the mixing step becomes the ratio Li/Me in the positive-electrode active material. As such, the ratio Li/Me in the lithium mixture is adjusted to be substantially the same as the ratio Li/Me in the positive-electrode active material to be manufactured.

The lithium compound to be used for forming the lithium mixture is not particularly limited, but for example, at least one compound selected from a group consisting of lithium hydroxide, lithium nitrate, and lithium carbonate may be used in view of the accessibility the above compounds.

In particular, in consideration of ease of handling and quality stability, at least one compound selected from a group consisting of lithium hydroxide and lithium carbonate is preferably used as the lithium compound for forming the lithium mixture.

Note that a general mixer can be used to mix the lithium compound in the mixing step. For example, a shaker mixer, a LBdige mixer, a Julia mixer, a V blender, or the like may be used.

(3) Firing Step

The firing step is a step of firing the lithium mixture obtained in the mixing step to obtain a positive-electrode active material. When the lithium mixture is fired in the firing step, lithium in the lithium compound diffuses into the heat treated particles so that a lithium-nickel-cobalt-manganese composite oxide is formed.

The firing temperature of the lithium mixture is not particularly limited, but for example, the firing temperature is preferably greater than or equal to 600° C. and less than or equal to 1000° C.

By controlling the firing temperature to be greater than or equal to 600° C., diffusion of lithium into the heat-treated particles may be sufficiently promoted, excessive lithium and unreacted particles may be prevented from remaining in the positive-electrode active material, and adequate battery characteristics may be obtained when the positive electrode active material is used in a battery.

However, when the firing temperature exceeds 1000° C., rampant sintering of the composite oxide particles and abnormal particle growth may occur, and the fired particles may become coarse such that minute pores may not be formed inside the particles. As a result, the specific surface area of the positive-electrode active material may be reduced, and the positive-electrode resistance may increase and the battery capacity may decrease in a battery using such positive-electrode active material.

Because the firing temperature of the lithium mixture also affects the specific surface area of the positive-electrode active material to be obtained, the firing temperature can be selectively adjusted to a suitable temperature within the above-described temperature range in view of the specific surface area required for the positive-electrode active material. For example, when a relatively small specific surface area of the positive electrode active material is particularly desired, the firing temperature is preferably set to a higher temperature greater than or equal to 900° C. and less than or equal to 950° C. According to studies conducted by the inventors of the present invention, by controlling the firing temperature to be within the above-described temperature range, the specific surface area of the positive-electrode active material may be be greater than or equal to 1.5 m$^2$/g and less than or equal to 8.0 m$^2$/g, and a positive-electrode mixed material paste may be easily manufactured. Also, when a nonaqueous electrolyte secondary battery is manufactured using such positive-electrode active material, a desirably high battery capacity can be obtained.

Note that from the perspective of promoting uniform reaction between the heat-treated particles and the lithium compound, the temperature is preferably raised to the above firing temperature at a temperature increase rate that is greater than or equal to 3° C./min and less than or equal to 10° C./min.

Further, by maintaining the temperature close to the melting point of the lithium compound for about 1 hour to 5 hours, a more uniform reaction can be promoted. In the case where the temperature is maintained close to the melting point of the lithium compound, the temperature can thereafter be raised to a predetermined firing temperature.

In the firing step, the firing temperature is preferably maintained for at least 1 hour, and more preferably for a time period greater than or equal to 2 hours and less than or equal to 24 hours.

By maintaining the firing temperature for at least 2 hours, formation of a lithium-nickel-cobalt-manganese composite oxide can be adequately promoted.

After maintaining the firing temperature for the above time period, although not particularly limited, in the case where the lithium mixture is loaded in a sagger in the firing step, the temperature is preferably decreased to be less than or equal to 200° C. at a decrease rate that is greater than or equal to 2° C./min and less than or equal to 10° C./min in order to prevent deterioration of the sagger.

The atmosphere during firing is preferably an oxidizing atmosphere, more preferably an atmosphere having an oxygen concentration that is greater than or equal to 18 vol % and less than or equal to 100 vol %, and more preferably a mixed-gas atmosphere including oxygen at the above oxygen concentration and an inert gas. That is, firing is preferably carried out in atmospheric air or in an oxygen-containing gas.

The oxygen concentration in the atmosphere during firing is preferably adjusted to be greater than or equal to 18 vol % as described above so that the crystallinity of the lithium-nickel-cobalt-manganese composite oxide may be adequately increased.

In particular, firing is preferably carried out in an oxygen airflow in consideration of battery characteristics.

Note that the furnace used in the firing step is not particularly limited as long as it is capable of heating the lithium mixture in atmospheric air or in an oxygen-containing gas. However, from the perspective of maintaining a uniform atmosphere within the furnace, an electric furnace that does not generate gas is preferably used. Also, note that either a batch type furnace or a continuous type furnace may be used.

Also, in the case where lithium hydroxide or lithium carbonate is used as the lithium compound, calcination is preferably performed after completing the mixing step, before performing the firing step. The calcination temperature is lower than the firing temperature, and is preferably greater than or equal to 350° C. and less than or equal to 800° C., and more preferably greater than or equal to 450° C. and less than or equal to 780° C.

The calcination is preferably performed for about 1 hour to 10 hours, and more preferably for about 3 hours to 6 hours.

Note that calcination is preferably performed by maintaining the temperature at the above calcination temperature. In particular, calcination is preferably performed at the reaction temperature for the reaction between lithium hydroxide or lithium carbonate and the heat-treated particles.

By performing calcination in the above-described manner, lithium may be adequately diffused into the heat-treated particles, and a uniform lithium-nickel-cobalt-manganese composite oxide may be obtained.

Note that aggregation or a mild sintering of the lithium-nickel-cobalt-manganese composite oxide particles obtained by the firing step may occur in some cases.

In such case, the lithium-nickel-cobalt-manganese composite oxide particles may be disintegrated. In this way, the positive-electrode active material including the lithium-nickel-cobalt-manganese composite oxide according to the present embodiment can be obtained.

Note that disintegration refers to a process of dissociating and separating secondary particles that have been aggregated while avoiding destruction of the secondary particles themselves by introducing mechanical energy to the aggregated secondary particles that have been formed by the necking (sintering) of the secondary particles in the firing step, for example.

[Nonaqueous Electrolyte Secondary Battery]

In the following, an example configuration of a nonaqueous electrolyte secondary battery according to an embodiment of the present invention will be described. The nonaqueous electrolyte secondary battery according to the present embodiment may have a positive electrode that uses the above-described positive-electrode active material.

First, the structure of the nonaqueous electrolyte secondary battery according to the present embodiment will be described below.

The nonaqueous electrolyte secondary battery according to the present embodiment (hereinafter also simply referred to as "secondary battery") may have a structure that is substantially identical to that of a general nonaqueous electrolyte secondary battery except that the above-described positive-electrode active material is used as the positive electrode material for its positive electrode.

For example, the secondary battery according to the present embodiment may include a case having a positive electrode, a negative electrode, a nonaqueous electrolyte, and a separator accommodated therein.

More specifically, the secondary battery according to the present embodiment may include an electrode body that is configured by stacking a positive electrode and a negative electrode via a separator. The electrode body may be impregnated with the nonaqueous electrolyte. A positive electrode current collector of the positive electrode may be connected to a positive electrode terminal communicating with the outside using a current collection lead, for example, and a negative electrode current collector of the negative electrode may be connected to a negative electrode terminal communicating with the outside using a current collection lead, for example. The electrode body having such a structure may be sealed within the case.

Note that the structure of the secondary battery according to the present embodiment is not limited to the above example. Also, the secondary battery can be in various formats, such as the cylinder format or the laminated format, for example.

(Positive Electrode)

In the following, the positive electrode of the secondary battery according to the present embodiment will be described. The positive electrode is a sheet member and is formed by coating and drying a positive electrode mixed material paste containing the above-described positive electrode active material on the surface of a current collector made of aluminum foil, for example.

Note that the positive electrode is appropriately treated according to the specific battery in which the positive electrode is used. For example, a cutting process may be performed to form the positive electrode into an appropriate size for a target battery, and a pressure compression process such as a roll press may be performed to increase the electrode density.

The positive electrode mixed material paste may be formed by adding a solvent to a positive electrode mixed material and kneading the positive electrode mixed material. The positive electrode mixed material may be formed by mixing the above-described positive electrode active material that is in powder form with a conductive material and a binder.

The conductive material is added to give appropriate conductivity to the electrode. The conductive material is not particularly limited, but for example, graphite (natural graphite, artificial graphite, expanded graphite, etc.) or carbon black material, such as acetylene black or ketjen black, may be used.

The binder is for binding together the positive electrode active material particles. The binder used in the positive electrode mixed material is not particularly limited, but for example, polyvinylidene fluoride (PVDF), polytetrafluoroethylene (PTFE), fluororubber, ethylene propylene diene rubber, styrene butadiene, cellulose resin, polyacrylic acid, and the like may be used.

Note that activated carbon or the like may be added to the positive electrode mixed material, for example. By adding activated carbon or the like, the electric double layer capacity of the positive electrode may be increased.

The solvent dissolves the binder and causes the positive-electrode active material, the conductive material, the activated carbon, and the like to disperse in the binder. The solvent is not particularly limited, but for example, an organic solvent such as N-methyl-2-pyrrolidone may be used.

Note that the mixing ratio of each substance in the positive electrode mixed material paste is not particularly limited. For example, assuming the solid content of the positive electrode mixed material (i.e., components of the positive electrode mixed material paste other than the solvent) is 100 parts by mass, as in a positive electrode of a general nonaqueous electrolyte secondary battery, the content of the positive-electrode active material may be adjusted to be greater than or equal to 60 parts by mass and less than or equal to 95 parts by mass, the content of the conductive material may be adjusted to be greater than or equal to 1 part by mass and less than or equal to 20 parts by mass, and the content of the binder may be adjusted to be greater than or equal to 1 part by mass and less than or equal to 20 parts by mass.

(Negative Electrode)

The negative electrode is a sheet member formed by applying a negative electrode mixed material paste on the surface of a metal foil current collector made of copper foil, for example, and drying the sheet member. Although the components of the negative electrode mixed material paste, the mix ratio thereof, and the material of the current collector may be different from the positive electrode, the negative electrode may be formed in substantially the same manner as the positive electrode. Also, as with the positive electrode, the negative electrode may be subjected to various treatments according to the target battery.

The negative electrode mixed material paste is a paste prepared by adding a suitable solvent to a negative electrode mixed material obtained by mixing together a negative-electrode active material and a binder.

The negative-electrode active material may be a material containing lithium, such as metallic lithium or a lithium alloy, or an insertion material capable of sustaining insertion and deinsertion of lithium ions, for example.

The insertion material is not particularly limited, but for example, an organic compound fired body, such as natural graphite, artificial graphite, or a phenolic resin, or a powder of a carbon substance such as coke (petroleum coke) may be used. When such a material is used as the negative-electrode active material, as with the positive electrode, a fluorine-containing resin such as PVDF may be used as the binder, and an organic solvent such as N-methyl-2-pyrrolidone may be used as the solvent for dispersing the negative electrode active material in the binder.

(Separator)

The separator is interposed between the positive electrode and the negative electrode and has a function of separating the positive electrode and the negative electrode and holding the electrolyte. Such a separator may be a thin film of polyethylene or polypropylene having a large number of fine pores, for example. However, the separator is not particularly limited as long as it has the above function.

(Nonaqueous Electrolyte)

The nonaqueous electrolyte is obtained by dissolving a lithium salt as a supporting salt in an organic solvent.

Examples of the organic solvent include cyclic carbonates, such as ethylene carbonate, propylene carbonate, butylene carbonate, and trifluoropropylene carbonate; chain carbonates, such as diethyl carbonate, dimethyl carbonate, ethylmethyl carbonate, and dipropyl carbonate; ether compounds, such as tetrahydrofuran, 2-methyltetrahydrofuran, and dimethoxyethane; a sulfur compound, such as ethylmethylsulfone and butane sultone; phosphorus compounds, such as triethyl phosphate and trioctyl phosphate. These substances may be used alone or in combination as the organic solvent.

Examples of the supporting salt include $LiPF_6$, $LiBF_4$, $LiClO_4$, $LiAsF_6$, $LiN(CF_3SO_2)_2$, and complex salts thereof.

The nonaqueous electrolyte may also contain a radical scavenger, a surfactant, a flame retardant, and the like in order to improve battery characteristics.

(Characteristics of Nonaqueous Electrolyte Secondary Battery According to Present Embodiment)

The nonaqueous electrolyte secondary battery according to the present embodiment may have the above-described structure, for example. Because the nonaqueous electrolyte secondary battery according to the present embodiment has a positive electrode that is formed using the above-described positive-electrode active material, high initial discharge capacity and low positive electrode resistance may be obtained to thereby achieve high capacity and high output.

(Application of Secondary Battery According to Present Embodiment)

In view of the above-described characteristics, the secondary battery according to the present embodiment may be suitably used as a power source of a small portable electronic device (notebook personal computer, mobile phone terminal, etc.) that requires high capacity.

Also, the secondary battery according to the present embodiment may be suitably used as a motor driving power source that requires high output. Note that when the size of a battery is increased, it becomes difficult to ensure safety such that an expensive protection circuit becomes indispensable. However, the secondary battery according to the present embodiment has excellent safety, and as a result, safety can be easily ensured, a protection circuit can be simplified, and manufacturing costs can be reduced. Because the secondary battery according to the present embodiment can be reduced in size and have increased output power, it can be suitably used as a power source for transportation equipment having restricted mounting space, for example.

EXAMPLES

In the following, the present invention will be described more specifically with reference to examples. However, the present invention is not limited to the following examples.

Sample preparation conditions and sample evaluation results of each example and comparative example are described below.

Example 1

1. Precursor Manufacture and Evaluation

First, a precursor was prepared by the following procedure.

Note that in all the examples and comparative examples described below, unless otherwise specified, reagent special grade samples manufactured by Wako Pure Chemical Industries, Ltd. were used to manufacture precursors, positive-electrode active materials and secondary batteries.

(Nucleation Step)

(1) Initial Aqueous Solution Preparation First, a reaction tank (5 L) was filled with about 1.2 L of water, and while stirring the water, the temperature inside the reaction tank (5 L) was set to 40° C. so that the temperatures of mixed aqueous solutions in a nucleation step, a nuclei disintegration step, and a particle growth step as described below would be controlled to 40° C. Note that the temperatures of the initial aqueous solution and the mixed aqueous solutions were controlled by adjusting the temperature of reaction tank heating water arranged around the reaction tank.

Then, an appropriate amount of 25 mass % ammonia water was added to the water in the reaction tank, and the ammonium ion concentration in the initial aqueous solution was adjusted to 5 g/L.

Further, 64% sulfuric acid was added to the initial aqueous solution to adjust the pH to 6.4.

Then, air gas as an oxygen-containing gas was supplied into the reaction tank from an air compressor at 4 L/min, and the interior of the reaction tank was purged to obtain an oxygen-containing atmosphere. The supply of the air gas was continued until the particle growth step was completed so that an air atmosphere, i.e., oxygen-containing atmosphere, could be maintained within the reaction tank.

(2) Metal Component-Containing Mixed Aqueous Solution Preparation

Next, nickel sulfate, cobalt sulfate, and manganese sulfate were dissolved in water to prepare a metal component-containing mixed aqueous solution with a metal ion concentration of 2.0 mol/L. In this metal component-containing mixed aqueous solution, the molar ratio of the respective metal elements was adjusted so that Ni:Co:Mn=0.165:0.165:0.67.

(3) pH Adjustment Aqueous Solution Preparation

Sodium carbonate and ammonium carbonate were dissolved in water to prepare a pH adjustment aqueous solution with a carbonate ion concentration of 2.2 mol/L. Note that the sodium carbonate and the ammonium carbonate were added to the pH adjustment aqueous solution such that the molar ratio of the sodium carbonate to the ammonium carbonate would be 9:2.

(4) Adding and Mixing Metal Component-Containing Mixed Aqueous Solution to Initial Aqueous Solution The metal component-containing mixed aqueous solution was added to the initial aqueous solution in the reaction tank at 10.3 ml/min to prepare a mixed aqueous solution.

Note that when adding the metal component-containing mixed aqueous solution, the pH adjustment aqueous solution was also added at the same time, and while controlling the pH value of the mixed aqueous solution in the reaction tank to not exceed 6.4 (nucleation pH value), the nucleation step was carried out by promoting crystallization for four minutes. Also, note that during the nucleation step, the fluctuation range of the pH value of the mixed aqueous solution was maintained within 0.2 above or below a center value (set pH value) of 6.2.

(5) Disintegration Step

Thereafter, stirring was continued for 5 minutes to disintegrate the nuclei.

(Particle Growth Step)

In the particle growth step, the same metal component-containing mixed aqueous solution and the pH adjustment aqueous solution used in the nucleation step were used. The procedure of the particle growth step will be described below.

(1) pH Adjustment of Mixed Aqueous Solution

In the particle growth step, first, the pH adjustment aqueous solution was added to the mixed aqueous solution obtained in the nucleation step to adjust the pH value to 7.4 (liquid temperature of 40° C. as standard temperature).

(2) Adding and Mixing Metal Component-Containing Mixed Aqueous Solution into Mixed Aqueous Solution The metal component-containing mixed aqueous solution was added to the pH-adjusted mixed aqueous solution at a rate of 10.3 ml/min.

At this time, the amount of the metal component-containing mixed aqueous solution and the amount of the pH adjustment aqueous solution added to the mixed aqueous solution were controlled so that the pH value of the mixed aqueous solution does not exceed 7.4 at a reaction temperature of 40° C. as the standard temperature.

After maintaining the above processing condition for 100 minutes, stirring was stopped and crystallization was terminated.

Then, the product obtained in the particle growth step was washed with water, filtered, and dried to obtain precursor particles (washing and drying step).

Note that in the particle growth step, the pH value of the mixed aqueous solution was controlled by adjusting the supply flow rate of the pH adjustment aqueous solution using a pH controller, and the fluctuation range of the pH value of the mixed aqueous solution was controlled to be no more than 0.2 above or below a center value (set pH value) of 7.2.

Also, in the nucleation step and the particle growth step, the ammonium ion concentration in the mixed aqueous solution was maintained at 5 g/L.

(Precursor Evaluation)

After dissolving the obtained precursor in an inorganic acid and subjecting the resulting sample to chemical analysis by ICP emission spectroscopy, it was confirmed that the sample was a carbonate with the composition Ni:Co:Mn=14.9 at %:16.7 at %:68.4 at %. Further, by measuring the elemental amount of hydrogen (H) in the sample using an element analyzer (FlashEA 1112 manufactured by Thermo Fisher Scientific) to calculate the mass ratio of hydrogen (H) to metal (Ni+Co+Mn), it was confirmed that the mass ratio was 1.69 indicating that a relatively large amount of hydrogen is contained in the sample. Further, it was confirmed that the sample includes a hydrogen-containing functional group.

Further, the average particle diameter $D_{50}$ of the precursor particles was measured using a laser diffraction/scattering type particle size distribution measuring apparatus (Microtrack HRA manufactured by Nikkiso Co., Ltd.), and as a result, it was confirmed that the average particle diameter of the precursor particles was 7.4 µm.

Also, by observing the obtained precursor particles using SEM (Scanning Electron Microscope S-4700 manufactured by Hitachi High-Technologies Corporation) (magnification: 3000×), it was confirmed that the obtained precursor particles were substantially spherical and were uniform in particle size. Note that in Table 2 shown below, the "precursor particle sphericality" is indicated as "○" for precursors that were observed to have particles in such state.

Figure 2:
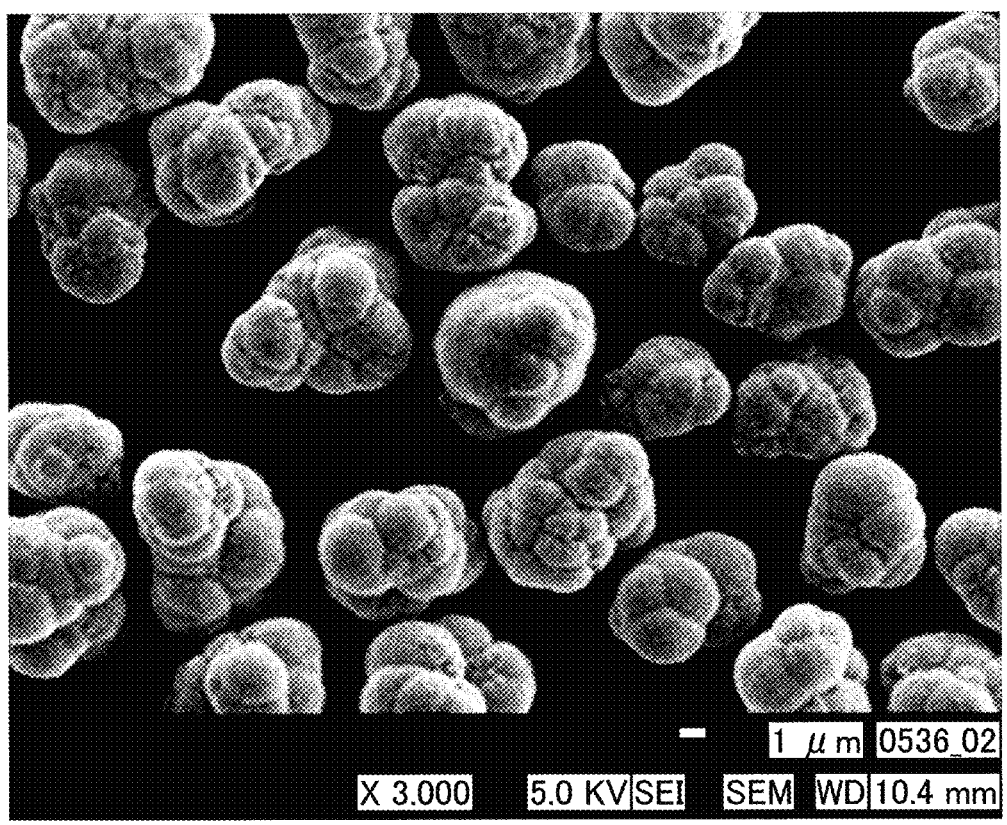
FIG. 2 is a SEM image of a precursor obtained in Example 1 of the present invention.

FIG. 2 shows a SEM image of the precursor particles.

2. Positive-Electrode Active Material Manufacture and Evaluation

Next, the obtained precursor was used to manufacture a positive-electrode active material, which was then evaluated.

(Positive-Electrode Active Material Manufacture)

The precursor was heat-treated at 500° C. for 2 hours in an airflow (oxygen: 21% by volume) and converted into composite oxide particles as heat-treated particles, which were then collected.

Next, the heat-treated particles and a lithium compound were mixed together to obtain a lithium mixture.

Specifically, lithium carbonate was weighed so that the ratio Li/Me of the lithium mixture to be obtained would be 1.5, and the lithium carbonate was mixed with the heat-treated particles to prepare the lithium mixture.

The mixing was carried out using a shaker mixer device (TURBULA Type T2C manufactured by Willy A. Bachofen (WAB)).

The obtained lithium mixture was calcined at 500° C. for 5 hours in the atmosphere (oxygen: 21% by volume), fired at 800° C. for 2 hours, cooled, and then disintegrated to obtain a positive-electrode active material.

Note that the composition of the obtained positive-electrode active material can be expressed as $Li_{1.5}Ni_{0.149}Co_{0.167}Mn_{0.684}O_2$.

(Positive-Electrode Active Material Evaluation)

The particle size distribution of the obtained positive-electrode active material was measured using the same method as that used for measuring the precursor particles as described above, and as a result, it was confirmed that the average particle diameter of the obtained positive-electrode active material was 7.0 µm.

Also, cross-sectional SEM observation of the positive-electrode active material was performed.

In the cross-sectional SEM observation of the positive-electrode active material, secondary particles constituting a plurality of positive-electrode active material particles were embedded in resin, the resulting sample was polished using a cross-section polisher to enable observation of cross sections of the particles, and the sample was then observed by SEM.

Figure 3A:
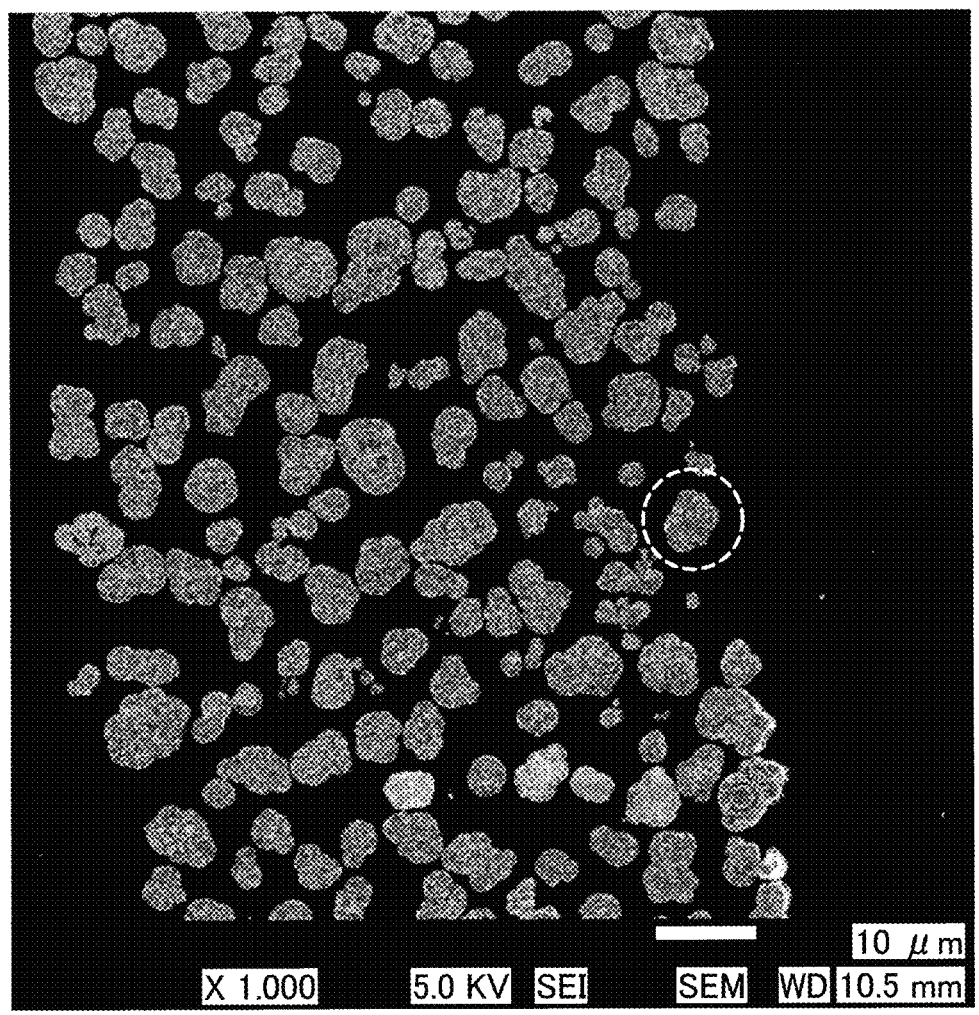
FIG. 3A is a SEM image of a positive-electrode active material obtained in Example 1 of the present invention.
Figure 3B:
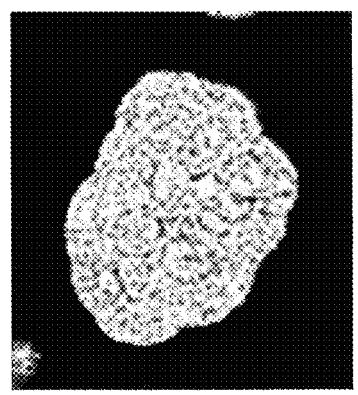
FIG. 3B is a partially enlarged view of FIG. 3A.

FIGS. 3A and 3B show cross-sectional SEM images of the positive-electrode active material. FIG. 3B is a partial enlarged view of a particle encircled by a dotted line in the SEM image of FIG. 3A.

As can be appreciated from FIGS. 3A and 3B, the particles of the obtained positive-electrode active material were substantially spherical. Note that in such case, the "sphericality" of the positive-electrode active material is indicated as "○" in Table 3. Also, it was confirmed that the secondary particles had porous structures with uniform fine pores extending into their cores.

Also, by observing 100 or more particles in these sectional SEM images, it was confirmed that the ratio of the number of particles having porous structures with pores extending into their cores (porous particles) was 100%. Also, by measuring the porosity of the porous particles using image analysis software, it was confirmed that the porous particles had a porosity of 22%.

Further, measurement of the tap density confirmed that the obtained positive-electrode active material had a tap density of 1.8 g/cc.

The tap density was measured after filling the obtained positive-electrode active material in a 20-ml graduated cylinder and densely packing the positive-electrode active material in the cylinder by repeatedly causing the cylinder to free-fall (drop) 500 times from a height of 2 cm.

Also, by measuring the specific surface area of the positive-electrode active material using a flow type gas adsorption specific surface area measuring apparatus (Multisorb manufactured by Yuasa Ionics Inc.), it was confirmed that the specific surface area of the positive-electrode active material was 12.4 m$^2$/g.

[Secondary Battery Manufacture]

The obtained positive-electrode active material was used to manufacture a 2032-type coin battery, which was then evaluated.

Figure 4:
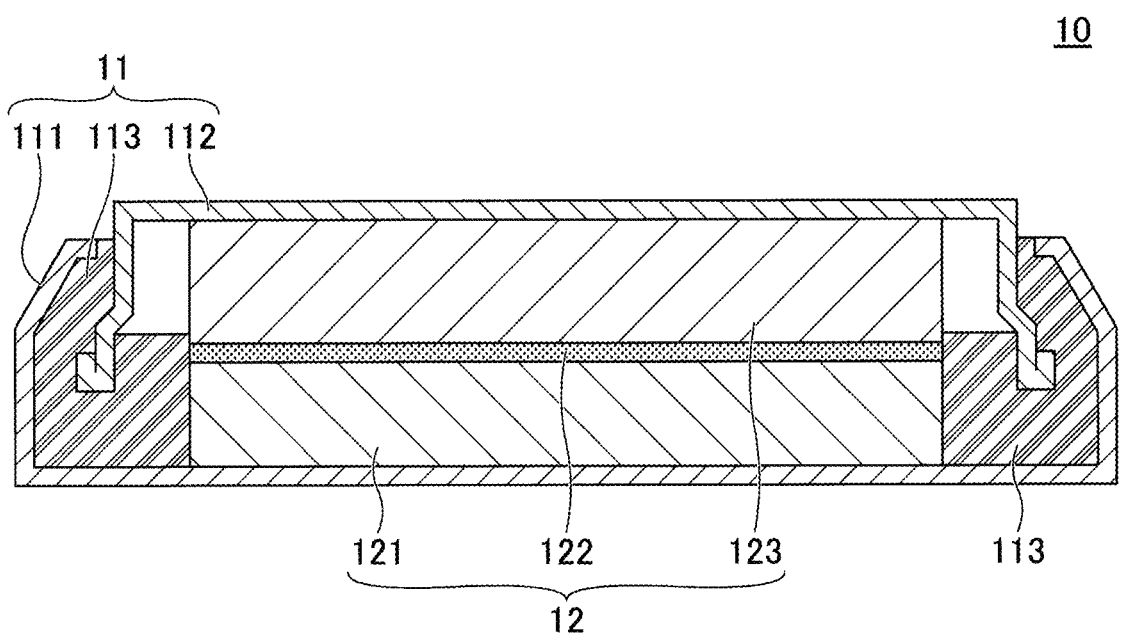
FIG. 4 is a cross-sectional view of a coin battery manufactured in Example 1 of the present invention.

The configuration of the manufactured coin battery will be described below with reference to FIG. 4. FIG. 4 schematically shows a cross-sectional configuration of a coin battery 10.

As shown in FIG. 4, the coin battery 10 includes a case 11 and an electrode 12 that is accommodated in the case 11.

The case 11 includes a positive electrode can 111 that is hollow and has an opening at one end and a negative electrode can 112 that is arranged in the opening of the positive electrode can 111. The negative electrode can 112 is arranged in the opening of the positive electrode can 111 such that a space for accommodating the electrode 12 is formed between the negative electrode can 112 and the positive electrode can 111.

The electrode 12 includes a positive electrode 121, a separator 122, and a negative electrode 123 that are stacked in above recited order. The electrode 12 is accommodated inside the case 11 such that the positive electrode 121 comes into contact with the inner surface of the positive electrode can 111 and the negative electrode 123 comes into contact with the inner surface of the negative electrode can 112.

The case 11 also includes a gasket 113 that is fixed between the positive electrode can 111 and the negative electrode can 112 so that electrical insulation may be maintained between the positive electrode can 111 and the negative electrode can 112. Also, the gasket 113 has a function of sealing the gap between the positive electrode can 111 and the negative electrode can 112 and keeping the interior of the case 11 airtight and liquid-tight from the outside.

The coin battery 10 was manufactured in the following manner. First, 52.5 mg of the obtained positive-electrode active material, 15 mg of acetylene black and 7.5 mg of polytetrafluoroethylene resin (PTFE) were mixed together with a solvent (N-methyl-2-pyrrolidone), and the mixed material was press-molded into a disk shape with a diameter of 11 mm and a thickness of 100 µm to prepare the positive electrode 121. The prepared positive electrode 121 was dried in a vacuum dryer at 120° C. for 12 hours. Using the positive electrode 121, the negative electrode 123, the separator 122, and an electrolytic solution, the coin battery 10 was manufactured in a glove box with an Ar atmosphere that was controlled to a dew point of −80° C.

Note that as the negative electrode 123, a negative electrode sheet stamped out into a disk shape with a diameter of 14 mm and formed by coating graphite powder with an average particle diameter of about 20 µm and polyvinylidene fluoride on a copper foil was used. As the separator 122, a porous polyethylene film having a thickness of 25 µm was used. As the electrolytic solution, an equal amount mixed solution of ethylene carbonate (EC) and diethyl carbonate (DEC) using 1 M of $LiClO_4$ as a supporting electrolyte (manufactured by Toyama Pharmaceutical Industry Co., Ltd.) was used.

[Battery Evaluation]

The initial discharge capacity for evaluating the performance of the obtained coin battery 10 is defined as follows.

The initial discharge capacity is defined as the capacity of the coin battery 10 measured after the following procedures have been implemented: leaving the coin battery 10 for about 24 hours after its manufacture to stabilize the open circuit voltage OCV (open circuit voltage), charging the coin battery 10 up to a cutoff voltage of 4.65 V while setting the current density with respect to the positive electrode to 0.05 C (270 mA/g is set to 1C), pausing for 1 hour, and then discharging the coin battery 10 to a cut-off voltage of 2.35 V.

Upon performing battery evaluation of the coin battery having a positive electrode manufactured using the positive-electrode active material according to the present embodiment, it was confirmed that the coin battery had an initial discharge capacity of 282 mAh/g. Also, in order to evaluate high discharge rate characteristics, the charge/discharge capacity was measured at 0.01 C, after which the charge/discharge capacity was measured at 0.2 C, 0.5 C and 1.0 C three times each, after which the charge/discharge capacity was measured at 2.0 C three times, and the average value of the above measurements was determined as the discharge capacity at a high discharge rate. The obtained value for the above coin battery was 216 mAh/g.

Table 1 shows the manufacturing conditions of the present example, Table 2 shows the characteristics of the precursor obtained in the present example, and Table 3 shows the characteristics of the positive-electrode active material obtained in the present example and evaluation results of the coin battery manufactured using the obtained positive-electrode active material. Note that the above tables show the same information for the following Example 2 and Comparative Examples 1 and 2.

Example 2

A precursor, a positive-electrode active material, and a secondary battery were manufactured and evaluated in the same manner as in Example 1, except that the process time of the particle growth step was changed to 196 minutes. The resulting characteristics of the obtained precursor, positive-electrode active material, and secondary battery are shown in Tables 1 to 3.

Note that the composition of the obtained positive-electrode active material can be expressed as $Li_{1.5}Ni_{0.154}Co_{0.167}Mn_{0.679}O_2$.

In the present example, it was confirmed that the average particle diameter of the particles contained in the precursor and the positive-electrode active material could be increased by lengthening the process time of the particle growth step. However, it was confirmed that the battery characteristics of the secondary battery were the same as those in Example 1.

Example 3

To add molybdenum as an additional element in the nucleation step and the particle growth step, an ammonium molybdate solution was added to the metal component-containing mixed aqueous solution.

Note that the ammonium molybdate solution was added to and mixed with the metal component-containing mixed aqueous solution such that the content ratio of Mo in the transition metal components including Ni, Co, Mn, and Mo of the metal component-containing mixed aqueous solution would be 1.5 at %. Note also, that the ratio of the metal components Ni, Co, and Mn in the metal component-containing mixed aqueous solution was arranged to be the same as that in Example 2.

Aside from using the above-described metal component-containing mixed aqueous solution, a precursor, a positive-electrode active material, and a secondary battery were manufactured and evaluated in the same manner as in Example 2. The resulting characteristics of the obtained precursor, positive-electrode active material, and secondary battery are shown in Tables 1 to 3.

The composition of the obtained positive-electrode active material can be expressed as $Li_{1.5}Ni_{0.14}Co_{0.167}Mn_{0.673}Mo_{0.015}O_2$.

Example 4

To add molybdenum as an additional element in the nucleation step and the particle growth step, an ammonium molybdate solution was added to the metal component-containing mixed aqueous solution.

Note that the ammonium molybdate solution was added to and mixed with the metal component-containing mixed aqueous solution such that the content ratio of Mo in the transition metal components including Ni, Co, Mn, and Mo in the metal component-containing mixed aqueous solution would be 3.6 at %. Note also, that the ratio of the metal components Ni, Co, and Mn in the metal component-containing mixed aqueous solution was arranged to be the same as that in Example 2.

Aside from using the above-described metal component-containing mixed aqueous solution, a precursor, a positive-electrode active material, and a secondary battery were manufactured and evaluated in the same manner as in Example 2. The resulting characteristics of the obtained precursor, positive-electrode active material, and secondary battery are shown in Tables 1 to 3.

The composition of the obtained positive-electrode active material can be expressed as $Li_{1.5}Ni_{0.160}Co_{0.175}Mn_{0.629}Mo_{0.06}O_2$.

Example 5

A precursor, a positive-electrode active material, and a secondary battery were manufactured and evaluated in the same manner as in Example 2, except that the firing temperature in the firing step was changed to 950° C. in manufacturing the positive-electrode active material. The resulting characteristics of the obtained precursor, positive-electrode active material, and secondary battery are shown in Tables 1 to 3.

The composition of the obtained positive-electrode active material can be expressed as $Li_{1.5}Ni_{0.154}Co_{0.167}Mn_{0.679}O_2$.

It was confirmed in the present example that by increasing the firing temperature in the firing step when manufacturing the positive-electrode active material, the specific surface area of the positive-electrode active material to be obtained can be controlled to be greater than or equal to 1.5 $m^2/g$ and less than or equal to 8.0 $m^2/g$ that is suitable for manufacturing a positive electrode mixed material paste. It was confirmed that even in such case, the initial discharge capacity and the discharge capacity under high discharge rate conditions of the secondary battery can be desirably high.

Example 6

A precursor, a positive-electrode active material, and a secondary battery were manufactured and evaluated in the same manner as in Example 2, except that the firing temperature in the firing step was changed to 900° C. when manufacturing the positive-electrode active material. The resulting characteristics of the obtained precursor, positive-electrode active material, and secondary battery are shown in Tables 1 to 3.

The composition of the obtained positive-electrode active material can be expressed as $Li_{1.5}Ni_{0.154}Co_{0.167}Mn_{0.679}O_2$.

It was confirmed in the present example that by increasing the firing temperature in the firing step when manufacturing the positive-electrode active material, the specific surface area of the positive-electrode active material to be obtained can be controlled to be greater than or equal to 1.5 $m^2/g$ and less than or equal to 8.0 $m^2/g$ that is suitable for manufacturing a positive electrode mixed material paste. It was confirmed that even in such case, the initial discharge capacity and the discharge capacity under high discharge rate conditions of the secondary battery can be desirably high.

Comparative Example 1

A precursor, a positive-electrode active material, and a secondary battery were manufactured and evaluated in the same manner as in Example 1, except that air was not blown into the reaction tank during manufacture of the precursor and the process time of the particle growth step was changed to 110 minutes. The resulting characteristics of the obtained precursor, positive-electrode active material, and secondary battery are shown in Tables 1 to 3.

As described above, no air was blown into the reaction tank when manufacturing the precursor in the present example, and as a result, the atmosphere within the reaction tank during manufacture of the precursor became an atmosphere containing carbon dioxide gas and ammonia gas generated from the mixed aqueous solution rather than an oxygen-containing atmosphere.

Comparative Example 2

A precursor, a positive-electrode active material, and a secondary battery were manufactured and evaluated in the same manner as in Example 2, except that the gas injected into the reaction tank during manufacture of the precursor was changed to nitrogen gas. The resulting characteristics of the obtained precursor, positive-electrode active material, and secondary battery are shown in Tables 1 to 3.

Note that cross-sectional SEM observations were made on the obtained positive-electrode active material in the same manner as in Example 1.

Figure 5A:
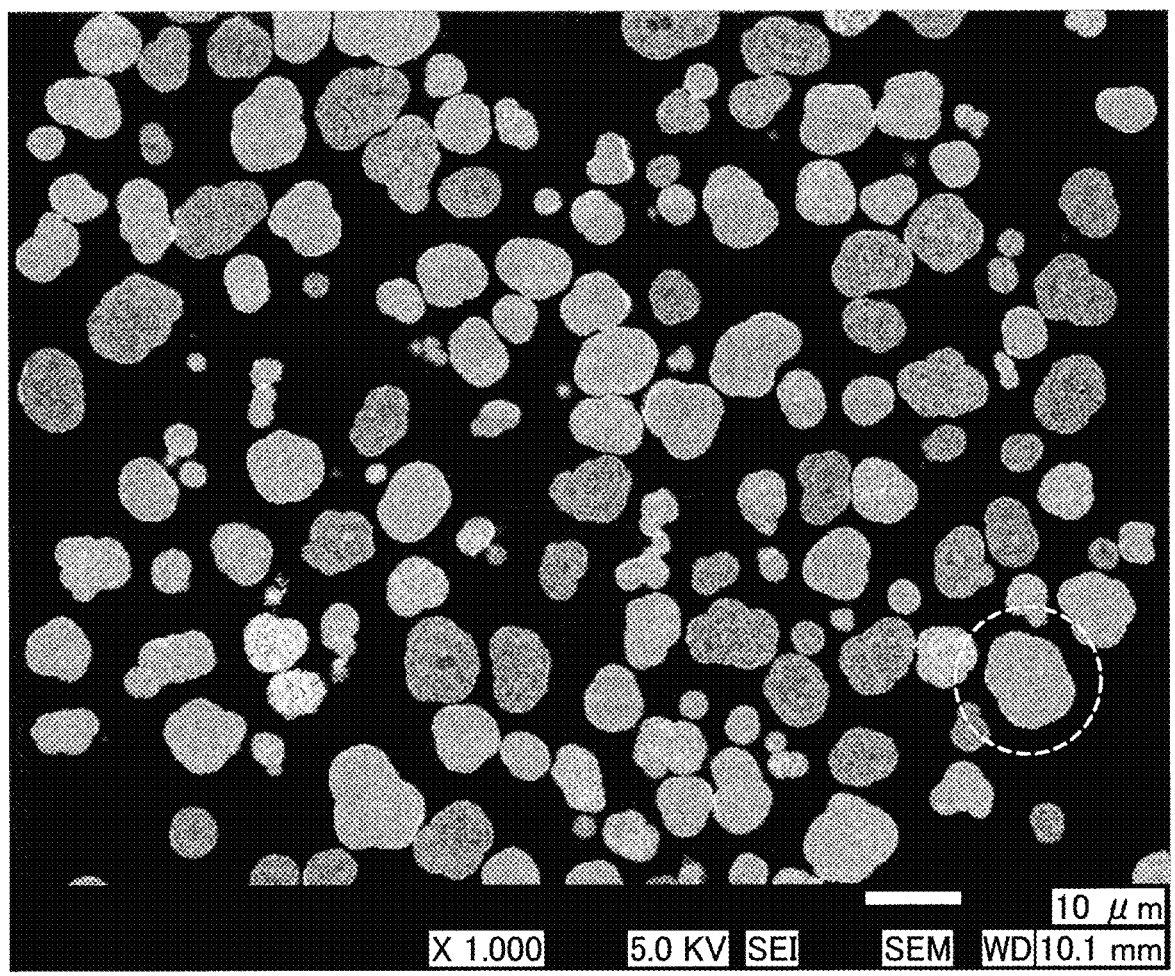
FIG. 5A is a SEM image of a positive-electrode active material obtained in Comparative Example 2.
Figure 5B:
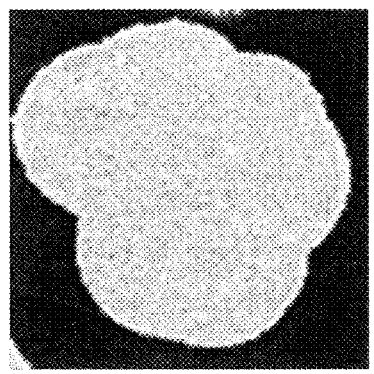
FIG. 5B is a partially enlarged view of FIG. 5A.

FIGS. 5A and 5B show cross-sectional SEM images of representative particles of the positive-electrode active material. Note that FIG. 5A shows a whole view, and FIG. 5B shows an enlarged view of a particle encircled by a dotted line in FIG. 5A.

From observing at least 100 particles, it was confirmed that the ratio of particles having porous structures with fine pores extending into their cores (porous particles) was 31%, and the porosity of these porous secondary particles was 18%. Also, it was confirmed that the non-porous secondary particles were dense particles with a porosity of no more than 3%.

TABLE 1

| | PRECURSOR MANUFACTURING STEP | | | | | | POSITIVE-ELECTRODE ACTIVE MATERIAL MANUFACTURING STEP | | |
| --- | --- | --- | --- | --- | --- | --- | --- | --- | --- |
| | NUCLEATION STEP | | | PARTICLE GROWTH STEP | | | | | |
| | MIXED AQUEOUS SOLUTION TEMPERATURE (° C.) | MIXED AQUEOUS SOLUTION AMMONIUM CONCENTRATION (g/L) | MIXED AQUEOUS SOLUTION pH | TIME (min) | MIXED AQUEOUS SOLUTION AMMONIUM CONCENTRATION (g/L) | MIXED AQUEOUS SOLUTION pH | HEAT TREATMENT TEMPERATURE (° C.) | Li/Me IN LITHIUM MIXTURE | FIRING TEMPERATURE (° C.) |
| EXAMPLE 1 | 40 | 5 | 6.4 | 100 | 5 | 7.4 | 500 | 1.5 | 800 |
| EXAMPLE 2 | 40 | 5 | 6.4 | 196 | 5 | 7.4 | 500 | 1.5 | 800 |
| EXAMPLE 3 | 40 | 5 | 6.4 | 196 | 5 | 7.4 | 500 | 1.5 | 800 |
| EXAMPLE 4 | 40 | 5 | 6.4 | 196 | 5 | 7.4 | 500 | 1.5 | 800 |
| EXAMPLE 5 | 40 | 5 | 6.4 | 196 | 5 | 7.4 | 500 | 1.5 | 950 |
| EXAMPLE 6 | 40 | 5 | 6.4 | 196 | 5 | 7.4 | 500 | 1.5 | 900 |
| COMPARATIVE EXAMPLE 1 | 40 | 5 | 6.4 | 110 | 5 | 7.4 | 500 | 1.5 | 800 |
| COMPARATIVE EXAMPLE 2 | 40 | 5 | 6.4 | 196 | 5 | 7.4 | 500 | 1.5 | 800 |

TABLE 2

| | PRECURSOR COMPOSITION (at %) | | | | | PRECURSOR |
|---|---|---|---|---|---|---|
| | Ni at % | Co at % | Mn at % | Mo at % | H/Me | PARTICLE SPHERICALITY |
| EXAMPLE 1 | 14.9 | 16.7 | 68.4 | 0 | 1.69 | ○ |
| EXAMPLE 2 | 15.4 | 16.7 | 67.9 | 0 | 1.66 | ○ |
| EXAMPLE 3 | 14.6 | 16.7 | 67.3 | 1.5 | 1.65 | ○ |
| EXAMPLE 4 | 16.0 | 17.5 | 62.9 | 3.6 | 1.60 | ○ |
| EXAMPLE 5 | 15.4 | 16.7 | 67.9 | 0 | 1.67 | ○ |
| EXAMPLE 6 | 15.4 | 16.7 | 67.9 | 0 | 1.67 | ○ |
| COMPARATIVE EXAMPLE 1 | 16.7 | 16.6 | 66.7 | 0 | 1.55 | ○ |
| COMPARATIVE EXAMPLE 2 | 16.0 | 16.8 | 67.2 | 0 | 1.45 | ○ |

TABLE 3

| | AVERAGE PARTICLE DIAMETER (μm) | SPHERICALITY | POROUS PARTICLE NUMBER RATIO (%) | POROUS PARTICLE POROSITY (%) | TAP DENSITY (g/cc) | SPECIFIC SURFACE AREA (m²/g) | INITIAL DISCHARGE CAPACITY (0.05 C) (mAh/g) | ENERGY DENSITY (TAP DENSITY × INITIAL DISCHARGE CAPACITY) (0.05 C) (mAh/cc) | DISCHARGE CAPACITY UNDER HIGH DISCHARGE RATE CONDITION (2 C) (mAh/g) |
|---|---|---|---|---|---|---|---|---|---|
| EXAMPLE 1 | 7.0 | ○ | 100 | 22 | 1.8 | 12.4 | 282 | 508 | 216 |
| EXAMPLE 2 | 7.7 | ○ | 100 | 21 | 1.9 | 12.1 | 282 | 536 | 213 |
| EXAMPLE 3 | 7.7 | ○ | 100 | 20 | 2.0 | 6.3 | 273 | 546 | 203 |
| EXAMPLE 4 | 6.7 | ○ | 100 | 18 | 1.9 | 9.9 | 270 | 513 | 195 |
| EXAMPLE 5 | 10.3 | ○ | 100 | 23 | 1.7 | 1.7 | 295 | 502 | 200 |
| EXAMPLE 6 | 10.3 | ○ | 100 | 22 | 1.8 | 4.5 | 287 | 517 | 222 |
| COMPARATIVE EXAMPLE 1 | 8.9 | ○ | 58 | 10 | 2.0 | 6.7 | 233 | 466 | 135 |
| COMPARATIVE EXAMPLE 2 | 8.5 | ○ | 31 | 18 | 2.0 | 3.7 | 204 | 408 | 92 |

It can be appreciated from Table 2 that the compositions of the precursors of Examples 1 to 6 were all at the target composition. Further, it can be appreciated from Table 3 that the porosity of the porous particles of the positive-electrode active materials obtained from the above precursors was at least 10%, and the ratio of the number of porous particles was 100% in all of the above examples.

It was confirmed that by manufacturing a battery using such positive-electrode active material, the initial discharge capacity and the discharge capacity under high discharge rate conditions of the battery may be desirably high.

In contrast, the ratio H/Me of the precursors obtained in Comparative Examples 1 and 2 was less than 1.6, and the compositions of the precursors were not at the target composition. As a result, when positive-electrode active materials were manufactured using these precursors, almost no porous particles were obtained and the porosity of the porous particles was also reduced.

Further, it was confirmed that the initial discharge capacity and the discharge capacity under high discharge rate conditions of the secondary batteries manufactured using such positive-electrode active materials were inferior to those of the secondary batteries of Examples 1 to 6.

Although the positive-electrode active material precursor for a nonaqueous electrolyte secondary battery, the positive-electrode active material for a nonaqueous electrolyte secondary battery, the method for manufacturing a positive-electrode active material precursor for a nonaqueous electrolyte secondary battery, and the method for manufacturing a positive-electrode active material for a nonaqueous electrolyte secondary battery according to the present invention have been described above with respect to certain illustrative embodiments and examples, the present invention is not limited to the above-described embodiments and examples. It will be apparent to those skilled in the art that various modifications and changes can be made without departing from the scope of present invention.

The present application is based on and claims the benefit of priority of Japanese Patent Application No. 2016-001366 filed on Jan. 6, 2016 and Japanese Patent Application No. 2016-186242 filed on Sep. 23, 2016, the entire contents of which are herein incorporated by reference.

The invention claimed is:

1. A positive-electrode active material for a nonaqueous electrolyte secondary battery, the positive-electrode active material comprising:
   a lithium metal composite oxide represented by general formula $Li_{1+a}Ni_xCo_yMn_zM_tO_2$ (where $0.25 \leq a \leq 0.55$, $x+y+z+t=1$, $0.05 \leq x \leq 0.3$, $0.1 \leq y \leq 0.4$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W); and
   a porous secondary particle formed by an aggregation of a plurality of primary particles;
   wherein a porosity of the porous secondary particle is greater than or equal to 10% and less than or equal to 30%, and a ratio of the number of the porous secondary particles with respect to a total number of particles included in the positive-electrode active material is greater than or equal to 80%.

2. The positive-electrode active material for a nonaqueous electrolyte secondary battery according to claim 1, wherein the additional element (M) in the general formula representing the lithium metal composite oxide includes molybdenum (Mo); and
   a content ratio of molybdenum (Mo) in metal components consisting of Ni, Co, Mn, and the additional element (M) contained in the lithium metal composite oxide is greater than or equal to 0.5 at % and less than or equal to 5 at %.

3. The positive-electrode active material for a nonaqueous electrolyte secondary battery according to claim 1, wherein a specific surface area of the positive-electrode active material is greater than or equal to 1.5 m²/g.

4. The positive-electrode active material for a nonaqueous electrolyte secondary battery according to claim 1, wherein a tap density of the positive-electrode active material is greater than or equal to 1.7 g/cc.

5. The positive-electrode active material for a nonaqueous electrolyte secondary battery according to claim 1, wherein a discharge capacity at a high discharge rate condition (2C) of the positive-electrode active material is greater than or equal to 195 mAh/g.

6. A positive-electrode manufacturing method for manufacturing the positive-electrode active material for a nonaqueous electrolyte secondary battery according to claim 1, the positive-electrode manufacturing method comprising:
    a precursor manufacturing method for manufacturing a positive-electrode active material precursor for a nonaqueous electrolyte secondary battery, wherein the positive-electrode active material precursor includes a nickel-cobalt-manganese carbonate composite represented by general formula $Ni_xCo_yMn_zM_1CO_3$ (where x+y+z+t=1, 0.05≤x≤0.3, 0.1≤y≤0.4, 0.55≤z≤0.8, 0≤t≤0.1, and M denotes at least one additional element selected from a group consisting of Mg, Ca, Al, Ti, V, Cr, Zr, Nb, Mo, and W) and a hydrogen-containing functional group, the precursor manufacturing method comprising:
    a nucleation step of forming nuclei in a mixed aqueous solution that is prepared by mixing together, under the presence of carbonate ions, an initial aqueous solution containing an alkaline substance and/or an ammonium ion supplier, an aqueous solution containing nickel as a metal component, an aqueous solution containing cobalt as a metal component, and an aqueous solution containing manganese as a metal component; and
    a particle growth step of growing the nuclei formed in the nucleation step;
wherein the nucleation step is performed under an oxygen-containing atmosphere while controlling a pH value of the mixed aqueous solution to be less than or equal to 7.5 at a reaction temperature of 40° C. as a standard temperature,
wherein the positive-electrode manufacturing method further includes:
a heat treatment step of heat-treating the positive-electrode active material precursor that has been obtained by the precursor manufacturing method, the heat treatment being performed at a temperature greater than or equal to 80° C. and less than or equal to 600° C.;
a mixing step of adding and mixing a lithium compound into particles obtained by the heat treatment step to form a lithium mixture; and
a firing step of firing the lithium mixture in an oxidizing atmosphere at a. temperature greater than or equal to 600° C and less than or equal to 1000° C.

* * * * *